United States Patent
Takano

(10) Patent No.: US 10,383,050 B2
(45) Date of Patent: Aug. 13, 2019

(54) APPARATUS FOR SELECTING A CELL IN A DIRECTIONAL BEAM NETWORK

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 156 days.

(21) Appl. No.: 15/526,000

(22) PCT Filed: Nov. 16, 2015

(86) PCT No.: PCT/JP2015/082157
§ 371 (c)(1),
(2) Date: May 11, 2017

(87) PCT Pub. No.: WO2016/121196
PCT Pub. Date: Aug. 4, 2016

(65) Prior Publication Data
US 2017/0311252 A1    Oct. 26, 2017

(30) Foreign Application Priority Data

Jan. 29, 2015 (JP) .................. 2015-015974

(51) Int. Cl.
H04W 48/20 (2009.01)
H04B 7/0452 (2017.01)
H04B 7/06 (2006.01)
H04W 16/28 (2009.01)
(Continued)

(52) U.S. Cl.
CPC .......... *H04W 48/20* (2013.01); *H04B 7/0452* (2013.01); *H04B 7/0617* (2013.01); *H04W 16/28* (2013.01); *H04W 36/0083* (2013.01); *H04W 48/12* (2013.01)

(58) Field of Classification Search
None
See application file for complete search history.

(56) References Cited

U.S. PATENT DOCUMENTS

2010/0234015 A1    9/2010 Iwamura
2015/0195019 A1    7/2015 Nagata et al.
(Continued)

FOREIGN PATENT DOCUMENTS

EP    3 151 451 A1    4/2017
JP    2011-109713 A    6/2011
(Continued)

OTHER PUBLICATIONS

Extended European Search Report issued May 16, 2018 in corresponding European Patent Application No. 15880088.8, 10 pages.
(Continued)

*Primary Examiner* — Christine T Duong
(74) *Attorney, Agent, or Firm* — Xsensus LLP

(57) ABSTRACT

To select cell more appropriately when transmission over directional beam is performed, there is provided an apparatus comprising: an acquisition unit that acquires information for correcting a result of measurements of a reference signal which is used for selecting a cell and transmitted over a plurality of directional beams in different directions; and a control unit that notifies a terminal apparatus of the information.

16 Claims, 19 Drawing Sheets

(51) Int. Cl.
*H04W 36/00* (2009.01)
*H04W 48/12* (2009.01)

(56) References Cited

U.S. PATENT DOCUMENTS

| | | | |
|---|---|---|---|
| 2015/0373601 A1* | 12/2015 | Benjebbour | H04W 72/082 |
| | | | 370/252 |
| 2016/0119936 A1* | 4/2016 | Kim | H04J 11/0053 |
| | | | 370/329 |
| 2017/0105223 A1* | 4/2017 | Zhang | H04W 16/28 |
| 2017/0117948 A1 | 4/2017 | Takano | |

FOREIGN PATENT DOCUMENTS

| | | |
|---|---|---|
| JP | 2014-30135 A | 2/2014 |
| JP | 2014-53811 A | 3/2014 |
| JP | 2014-64294 A | 4/2014 |
| JP | 2014-155093 A | 8/2014 |
| JP | 2014-204305 A | 10/2014 |
| WO | 2014/196295 A1 | 12/2014 |

OTHER PUBLICATIONS

International Search Report dated Feb. 9, 2016 in PCT/JP2015/082157 filed Nov. 16, 2015.

* cited by examiner

FIG. 10

| NUMBER OF BEAMS | POWER REDUCTION AMOUNT (dB) PER BEAM |
|---|---|
| 1 | 0 |
| 2 | -3.01 |
| 4 | -6.02 |
| 8 | -9.03 |
| 16 | -12.04 |
| 32 | -15.05 |
| 64 | -18.06 |

FIG. 11

| INDEX | POWER REDUCTION AMOUNT DIFFERENCE (dB) |
|---|---|
| 0 | 0 |
| 1 | 3.01 |
| 2 | 6.02 |
| 3 | 9.03 |
| 4 | 12.04 |
| 5 | 15.05 |
| 6 | 18.06 |

FIG. 12

| INDEX | POWER REDUCTION AMOUNT (dB) |
|---|---|
| 0 | 0 |
| 1 | -3.01 |
| 2 | -6.02 |
| 3 | -9.03 |
| 4 | -12.04 |
| 5 | -15.05 |
| 6 | -18.06 |

FIG. 13

| INDEX | NUMBER OF BEAMS |
|---|---|
| 0 | 1 |
| 1 | 2 |
| 2 | 4 |
| 3 | 8 |
| 4 | 16 |
| 5 | 32 |
| 6 | 64 |

APPARATUS FOR SELECTING A CELL IN A DIRECTIONAL BEAM NETWORK

TECHNICAL FIELD

The present disclosure relates to apparatuses.

BACKGROUND ART

In the Third Generation Partnership Project (3GPP), various techniques for improving the capacity of a cellular system are currently studied in order to accommodate explosively increasing traffic. It is also envisaged that the required capacity will become about 1000 times the current capacity in the future. Techniques such as multi-user multi-input multiple-input multiple-output (MU-MIMO), coordinated multipoint (CoMP), and the like could increase the capacity of a cellular system by a factor of as low as less than ten. Therefore, there is a demand for an innovative technique.

For example, as a technique for significantly increasing the capacity of a cellular system, a base station may perform beamforming using a directional antenna including a large number of antenna elements (e.g., about 100 antenna elements). Such a technique is a kind of technique called large-scale MIMO or massive MIMO. By such beamforming, the half-width of a beam is narrowed. In other words, a sharp beam is formed. Also, if the large number of antenna elements are arranged in a plane, a beam aimed in a desired three-dimensional direction can be formed.

For example, Patent Literatures 1 to 3 disclose techniques applied when a directional beam aimed in a three-dimensional direction is used.

CITATION LIST

Patent Literature

Patent Literature 1: JP 2014-204305A
Patent Literature 2: JP 2014-53811A
Patent Literature 3: JP 2014-64294A

DISCLOSURE OF INVENTION

Technical Problem

For example, as disclosed in Patent Literatures 1 and 2 above, it is considered that a reference signal may be transmitted over a plurality of directional beams. However, power allocated to one directional beam of the reference signal may be different from power allocated to one directional beam of a data signal. Accordingly, a measurement result (i.e., received power/received quality) on the reference signal transmitted over directional beams may be significantly different from actual received power/received quality of the data signal transmitted over directional beams. Consequently, there is a possibility of a cell selected on the basis of the measurement result not being an appropriate cell.

Accordingly, it is desirable to provide a system which enables selecting cell more appropriately when transmission over directional beams is performed.

Solution to Problem

According to the present disclosure, there is provided an apparatus including: an acquisition unit that acquires information for correcting a result of measurements of a reference signal which is used for selecting a cell and transmitted over a plurality of directional beams in different directions; and a control unit that notifies a terminal apparatus of the information.

Further, according to the present disclosure, there is provided an apparatus including: an acquisition unit that acquires information for correcting a result of measurements of a reference signal which is used for selecting a cell and transmitted over a plurality of directional beams in different directions; and a control unit that corrects the result of the measurements of the reference signal on the basis of the information.

Advantageous Effects of Invention

As described above, according to the present disclosure, it is possible to appropriately select a cell when transmission over directional beams is performed. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 10 is a diagram for describing an example of a relationship between a number of beams and a power reduction amount per beam.

FIG. 11 is a diagram for describing an example of correction information.

FIG. 12 is a diagram for describing an example of first power related information and second power related information included in the correction information.

FIG. 13 is a diagram for describing an example of first beam number information and second beam number information included in the correction information.

MODE(S) FOR CARRYING OUT THE INVENTION

Figure 1:
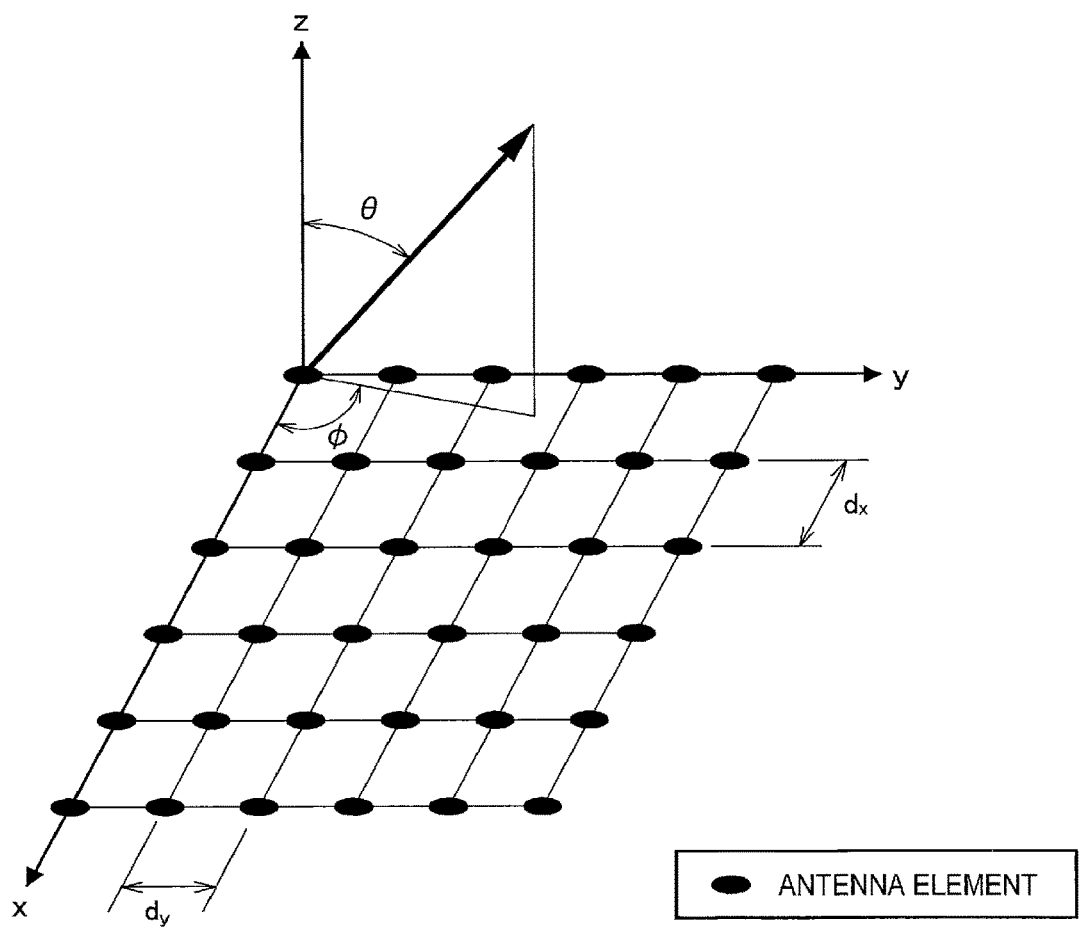
FIG. 1 is a diagram for describing a weight set for large-scale MIMO beamforming.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Description will be given in the following order.
1. Introduction
1.1. Related art
1.2. Technical problems
2. Schematic configuration of system
3. Configuration of each apparatus
3.1. Configuration of base station
3.2. Configuration of terminal apparatus
4. First embodiment
4.1. Technical features
4.2. Processing flow
5. Second embodiment
5.1. Technical features
5.2. Processing flow
6. Application examples
6.1. Application examples for base station
6.2. Application examples for terminal apparatus
7. Conclusion <<1. Introduction>>

First of all, techniques related to an embodiment of the present disclosure and technical problems according to the present embodiment will be described with reference to FIGS. 1 to 6.

<1.1. Related Art>

Beamforming, measurements, cell selection, and beamforming with respect to a CRS will be described as techniques related to an embodiment of the present disclosure with reference to FIGS. 1 to 4.

(1) Beamforming (a) Necessity of Large-Scale MIMO

In the 3GPP, various techniques for improving the capacity of a cellular system are currently studied in order to accommodate explosively increasing traffic. It is envisaged that the required capacity will become about 1000 times the current capacity in the future. Techniques such as MU-MIMO, CoMP, and the like could increase the capacity of a cellular system by a factor of as low as less than ten. Therefore, there is a demand for an innovative technique.

Release 10 of the 3GPP specifies that evolved Node B (eNB) is equipped with eight antennas. Therefore, the antennas can provide eight-layer MIMO in the case of single-user multi-input multiple-input multiple-output (SU-MIMO). Eight-layer MIMO is a technique of spatially multiplexing eight separate streams. Alternatively, the antennas can provide four-user two-layer MU-MIMO.

User equipment (UE) has only a small space for accommodating an antenna, and limited processing capability, and therefore, it is difficult to increase the number of antenna elements in the antenna of UE. However, recent advances in antenna mounting technology have allowed eNB to accommodate a directional antenna including about 100 antenna elements.

For example, as a technique for significantly increasing the capacity of a cellular system, a base station may perform beamforming using a directional antenna including a large number of antenna elements (e.g., about 100 antenna elements). Such a technique is a kind of technique called large-scale MIMO or massive MIMO. By such beamforming, the half-width of a beam is narrowed. In other words, a sharp beam is formed. Also, if the large number of antenna elements are arranged in a plane, a beam aimed in a desired three-dimensional direction can be formed. For example, it has been proposed that, by forming a beam aimed at a higher position than that of a base station (e.g., a higher floor of a high-rise building), a signal is transmitted to a terminal apparatus located at that position.

In typical beamforming, the direction of a beam can be changed in the horizontal direction. Therefore, it can be said that the typical beamforming is two-dimensional beamforming. Meanwhile, in large-scale MIMO (or massive MINMO) beamforming, the direction of a beam can be changed in the vertical direction as well as the horizontal direction. Therefore, it can be said that large-scale MIMO beamforming is three-dimensional beamforming.

Note that the increase in the number of antennas allows for an increase in the number of MU-MIMO users. Such a technique is another form of the technique called large-scale MIMO or massive MIMO. Note that when the number of antennas in UE is two, the number of spatially separated streams is two for a single piece of UE, and therefore, it is more reasonable to increase the number of MU-MIMO users than to increase the number of streams for a single piece of UE.

(b) Weight Set

A set of weight for beamforming are represented by a complex number (i.e., a set of weight coefficients for a plurality of antenna elements). An example of a weight set particularly for large-scale MIMO beamforming will now be described with reference to FIG. 1.

FIG. 1 is a diagram for describing a weight set for large-scale MIMO beamforming. FIG. 1 shows antenna elements arranged in a grid pattern. FIG. 1 also shows two orthogonal axes x and y in a plane in which the antenna elements are arranged, and an axis z perpendicular to the plane. Here, the direction of a beam to be formed is, for example, represented by an angle phi (Greek letter) and an angle theta (Greek letter). The angle phi (Greek letter) is an angle between an xy-plane component of the direction of a beam and the x-axis. Also, the angle theta (Greek letter) is an angle between the beam direction and the z-axis. In this case, for example, the weight coefficient $V_{m,n}$ of an antenna element which is m-th in the x-axis direction and n-th in the y-axis direction is represented as follows.

$$V_{m,n}(\theta, \varphi, f) = \exp\left(j2\pi\frac{f}{c}\{(m-1)d_x\sin(\theta)\cos(\varphi) + (n-1)d_y\sin(\theta)\sin(\varphi)\}\right)$$ [Math. 1]

In formula (1), f is a frequency, and c is the speed of light. Also, j is the imaginary unit of a complex number. Also, $d_x$ is an interval between each antenna element in the x-axis direction, and $d_y$ is an interval between each antenna element in the y-axis direction. Note that the coordinates of an antenna element are represented as follows.

$$x=(m-1)d_x, \; y=(n-1)d_y$$

Note that a typical weight set for beamforming (two-dimensional beamforming) may be divided into a weight set for forming a beam aimed in a desired horizontal direction, and a weight set for a phase adjustment between antennas. Therefore, a weight set for large-scale MIMO beamforming may be divided into a first weight set for forming a beam aimed in a desired vertical direction, a second weight set for forming a beam aimed in a desired horizontal direction, and a third weight set for the phase adjustment transfer between antennas.

(c) Change in Environment Due to Large-Scale MIMO Beamforming

When large-scale MIMO beamforming is performed, the gain reaches 10 dB or more. In a cellular system employing the above beamforming, a significant change in radio wave environment may occur compared to a conventional cellular system.

(d) Case Where Large-Scale MIMO Beamforming is Performed

For example, a base station in urban areas may form a beam aimed at a high-rise building. Also, even in rural areas, a base station of a small cell may form a beam aimed at an area around the base station. Note that it is highly likely that a base station of a macro-cell in rural areas does not perform large-scale MIMO beamforming.

Figure 2:
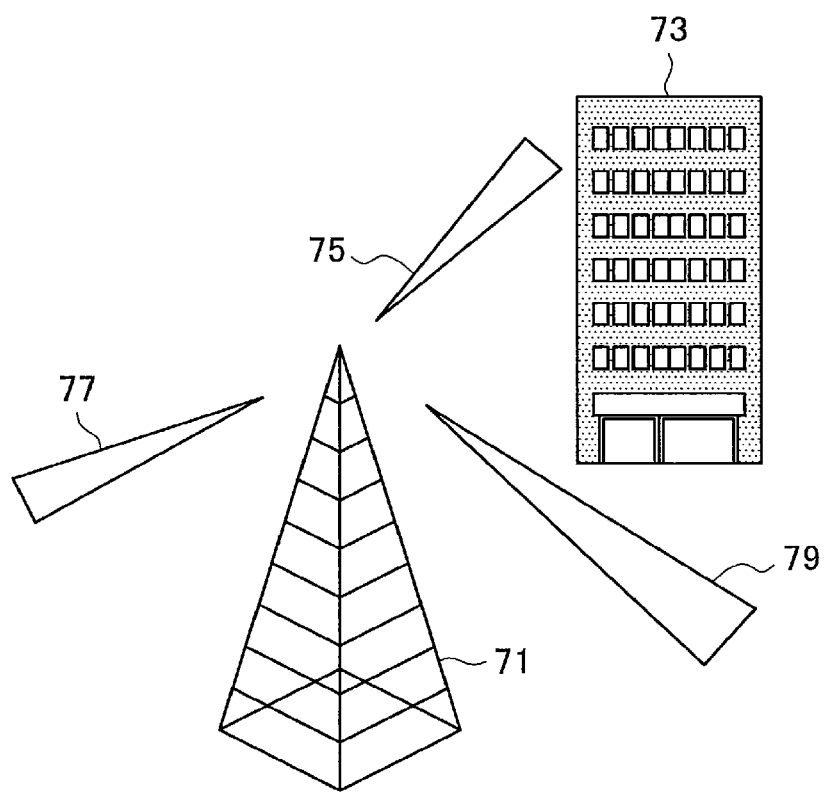
FIG. 2 is a diagram for describing an example of a case in which beamforming of large-scale MIMO is performed.

FIG. 2 is a diagram for describing an example of a case in which beamforming of large-scale MIMO is performed. Referring to FIG. 2, a base station 71 and a high-rise building 73 are illustrated. For example, the base station 71 forms a directional beam 79 toward the high-rise building 73 in addition to directional beams 75 and 77 toward the ground.

(2) Measurements
(a) Measurements of CRS

In Long Term Evolution (LTE), a terminal apparatus measures a cell-specific reference signal (CRS) transmitted from a base station. Specifically, a terminal apparatus receives a CRS transmitted from a base station, and measures the quality of a transmission path between the base station and the terminal apparatus. The measurements are called "radio resource management (RRM) measurements" or simply "measurements."

The result of the measurements is used in order to select a cell for a terminal apparatus. Specifically, for example, the result of the measurements is used in cell selection/cell reselection performed by a terminal apparatus which is a radio resource control (RRC) idle. Also, for example, the result of the measurements is reported by an RRC-connected terminal apparatus to a base station, and is used by the base station in handover decision.

As described above, the above measurements are performed by reception of a CRS. A CRS is a signal for measuring the quality of the transmission path of non-directional radio waves, and therefore, is transmitted without beamforming. In other words, a CRS is transmitted without being multiplied by a weight set for beamforming.

Note that there is a reference signal for demodulation called a demodulation reference signal (DM-RS) or a UE specific reference signal. The reference signal for demodulation is multiplied by a weight set for beamforming, and therefore, is not desirable for measurements of the quality of the transmission path of non-directional radio waves. Also, there is a reference signal called a channel state information reference signal (CSI-RS). A CSI-RS is transmitted without beamforming as with a CRS. However, the transmission frequency of a CSI-RS is low, and therefore, it takes a long time to perform measurements by reception of a CSI-RS. A relationship between multiplication of weight coefficients and insertion (or mapping) of a reference signal will be described with reference to FIG. 2.

Figure 3:
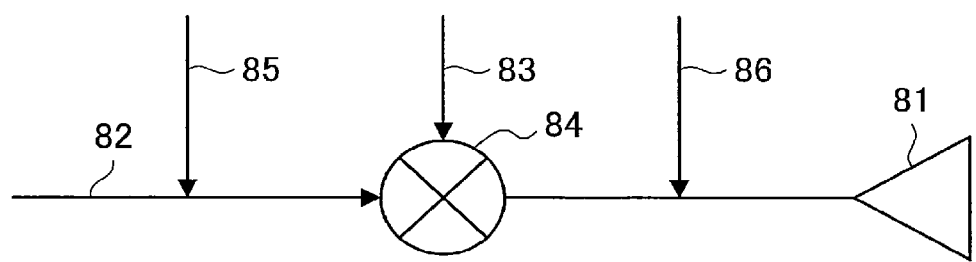
FIG. 3 is a diagram for describing a relationship between multiplication of weight coefficients and insertion of a reference signal.

FIG. 3 is a diagram for describing the relationship between multiplication of weight coefficients and insertion (or mapping) of a reference signal. Referring to FIG. 3, a transmission signal 81 corresponding to each antenna element 81 is complex-multiplied by a weight coefficient 83 by a multier 84. Thereafter, the transmission signal 82 complex-multiplied by the weightefficient 83 is transmitted from the antenna element 81. Also, a DR-MS 85 is inserted before the multiplier 84, and is complex-multiplied by the weight coefficient 83 by the multiplier 84. Thereafter, the DR-MS 85 complex-multiplied by the weight coefficient 83 is transmitted from the antenna element 81. Meanwhile, a CRS 86 (and a CSI-RS) is inserted after the multiplier 84. Thereafter, the CRS 86 (and the CSI-RS) is transmitted from the antenna element 81 without being multiplied by the weight coefficient 83.

(b) RSRP and RSRQ

In LTE, measurements of a CRS are measurements of reference signal received power (RSRP) and/or reference signal received quality (RSRQ). In other words, a terminal apparatus acquires RSRP and/or RSRQ as a result of measurements of a CRS. RSRQ is calculated from RSRP and received signal strength indicator (RSSI).

RSRP is CRS received power per each single resource element. In other words, RSRP is the average value of CRS received power. CRS received power is obtained by detection of a correlation between a received signal in a CRS resource element and a CRS, which is a known signal. RSRP corresponds to a desired signal "S (signal)."

RSSI is the total power of a signal per orthogonal frequency division multiple access (OFDMA) symbol. Therefore, RSSI includes a desired signal, an interference signal, and noise. Specifically, RSSI corresponds to "S (signal)+I (interference)+N (noise)."

RSRQ is RSRP/(RSSI/N), where N is the number of resource blocks used in calculation of RSSI. The resource blocks are resource blocks arranged in the frequency direction. Therefore, RSRQ is a value obtained by dividing RSRP by RSSI per resource block. In other words, RSRQ corresponds to a signal-to-interference-plus-noise ratio (SINR).

As described above, received power (i.e., RSRP), and the quality of reception (i.e., RSRQ) such as SINR, are obtained by measurements of a CRS.

Note that received quality (i.e., RSRQ) is used in cell selection, which will be described below. This is because a cell with large interference may be selected when a cell is selected on the basis of only received power (i.e., RSRP).

(c) Effect of Averaging

In order to acquire RSRP and RSRQ, it is necessary to receive a signal for several milliseconds to several tens of milliseconds, and calculate the average of the received power. This is because when RSRP and RPRQ are averaged over only one slot or one subset, the averages are likely to be affected by an instantaneous change of a channel such as fading or the like.

Note that the above averaging technique is provided to each terminal apparatus, and is not specified in the standard.

(3) Cell Selection
(a) Cell Selection Example

For example, when a terminal apparatus is RRC idle, the terminal apparatus performs cell selection/cell reselection. Specifically, the terminal apparatus selects a cell for communication (e.g., a cell for reception of paging).

Also, for example, a base station performs handover decision. Specifically, a base station selects a target cell for a terminal apparatus, and decides to perform handover from a serving cell for the terminal apparatus to the target cell.

Also, for example, a base station performs addition of a secondary cell (SCell) of carrier aggregation. The SCell is also called a secondary component carrier (SCC).

Note that, as used herein, the term "cell" may mean the communication area of a base station, or a frequency band used by a base station. Also, as used herein, the term "cell" may mean a primary cell (PCell) or SCell of carrier aggregation. The PCell is also called a primary component carrier (PCC). The SCell is also called a secondary component carrier (SCC).

(b) Cell Selection where Beamforming is Performed

As described above, in a technical form called large-scale MIMO or massive MIMO, a base station performs beamforming using a directional antenna including a large number of antenna elements (e.g., about 100 antenna elements). In this case, a base station can change the direction of a beam not only in the horizontal direction but also in the vertical direction. Therefore, as an example, a base station can form a beam aimed at a position higher than that of the base station (e.g., a higher floor in a high-rise building) to improve throughput at a high position. As another example, a small-size base station can form a beam for a nearby area so that its interference on an adjacent base station can be reduced.

Here, when the transmission and reception of a signal by large-scale MIMO beamforming becomes the mainstream, there will be a doubt as to whether cell selection could be performed on the basis of the result of measurements of a CRS.

Specifically, it is the quality of the transmission path of non-directional radio waves that can be determined on the basis of measurements of a CRS. However, the transmission path of non-directional radio waves is totally different from the transmission path of a sharp beam formed by large-scale MIMO beamforming. Therefore, when a signal is normally transmitted and received by the beamforming, a suitable cell may not be selected by cell selection which is performed on the basis of the result of measurements of a CRS.

As an example, when a terminal apparatus transmits and receives a signal in a cell which has been selected on the basis of the result of measurements of a CRS, significant interference may occur due to a sharp beam from an adjacent base station. As another example, even when the result of measurements of a CRS for a certain cell is better than that for another cell, then if beamforming is performed, the communication quality of the other cell may be better than that of the certain cell.

As described above, when beamforming is performed, a suitable cell for a terminal apparatus may fail to be selected.

(c) Case where Measurements of CRS are not Desirable

As described above, for example, it is considered that large-scale MIMO beamforming is performed by base stations in urban areas or base stations in small cells. Therefore, it is not desirable that cell selection for these base stations is performed on the basis of measurements of a CRS.

(4) Beamforming with Respect to CRS

Since a CRS is transmitted using omnidirectional radio waves in general, a measurement result (received power/received quality) on the CRS may be significantly different from received power/received quality of a data signal transmitted over directional beams. In order to solve this, is it considered that the CRS may be transmitted over directional beams. A detailed example of this will be described below with reference to FIG. 4.

Figure 4:
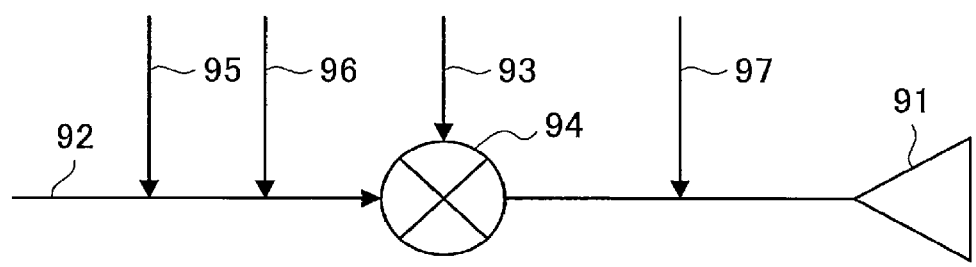
FIG. 4 is a diagram for describing another relationship between multiplication of weight coefficients and insertion of a reference signal.

FIG. 4 is a diagram for describing another relationship between multiplication of weight coefficients and insertion (or mapping) of a reference signal. Referring to FIG. 4, a transmission signal 92 corresponding to each antenna element 91 is complex-multiplied by a weight coefficient 93 by a multiplier 94. Thereafter, the transmission signal 92 complex-multiplied by the weight coefficient 93 is transmitted from the antenna element 91. Also, a DR-MS 95 is inserted before the multiplier 94, and is complex-multiplied by the weight coefficient 93 by the multiplier 94. Thereafter, the DR-MS 95 complex-multiplied by the weight coefficient 93 is transmitted from the antenna element 91. Further, a CRS 96 is inserted in front of the multiplier 94, and is complex-multiplied by the weight coefficient 93 in the multiplier 94. Then, the CRS 96 complex-multiplied by the weight coefficient 93 is transmitted from the antenna element 91. Meanwhile, a normal CRS 97 (and a CSI-RS) is inserted after the multiplier 94. Thereafter, the normal CRS 97 (and the CSI-RS) is transmitted from the antenna element 91 without being multiplied by the weight coefficient 93.

<1.2. Technical Problems>

Next, technical problems according to the present embodiment will be described with reference to FIGS. 5 and 6.

(1) Number of Directional Beams and Power
(a) CRS

Although a CRS is transmitted using omnidirectional radio waves in general, it is also considered that the CRS may be transmitted over a plurality of directional beams.

For example, the CRS is used for cell selection, and thus directional beams of the CRS are required to cover directional beam candidates to a certain degree. Accordingly, the number of directional beams of the CRS may increase. Since there is an upper limit on power that can be allocated by a base station for transmission, power allocated to each directional beam decreases when the number of directional beams increases. A specific example of this will be described below with reference to FIGS. 5 and 6.

Figure 5:
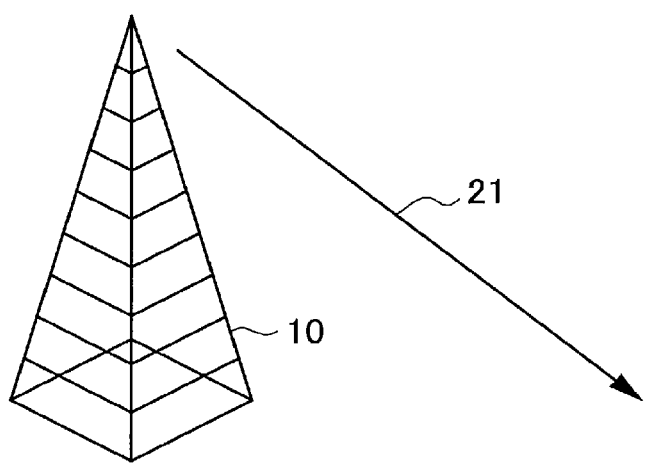
FIG. 5 is a first diagram for describing an example of a relationship between the number of directional beams of a CRS and power.
Figure 6:
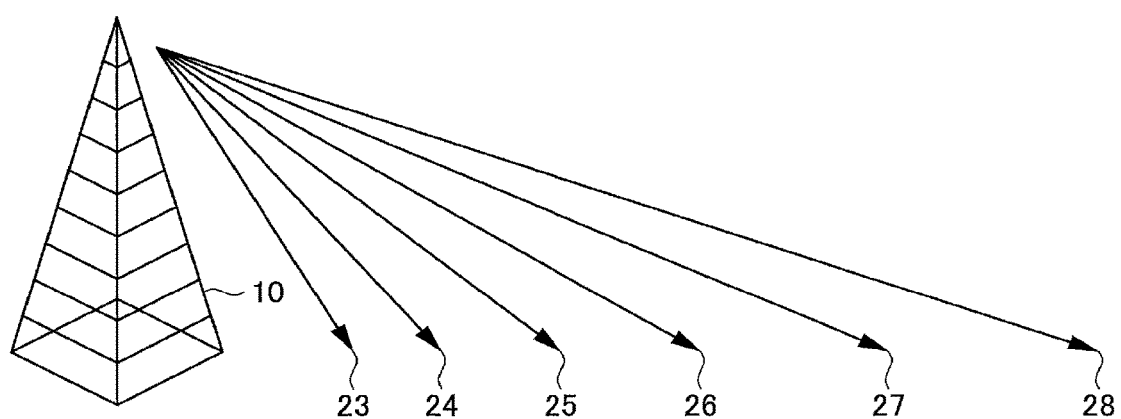
FIG. 6 is a second diagram for describing an example of a relationship between the number of directional beams of the CRS and power.

FIGS. 5 and 6 are diagrams for describing an example of a relationship between the number of directional beams of the CRS and power. For example, a base station 10 transmits the CRS over one directional beam 21 in the example of FIG. 5. On the other hand, the base station 10 transmits a CRS over six directional beams 23, 24, 25, 26, 27 and 28 in the example of FIG. 6. In this case, power allocated to each of the six directional beams 23, 24, 25, 26, 27 and 28 in the example of FIG. 6 is, for example, one sixth of power allocated to the directional beam 21 in the example of FIG. 5.

The number of directional beams of a CRS is considered to be limited to a certain number. This is because there is no difference from transmission of the CRS using omnidirectional radio waves when the number of directional beams of the CRS remarkably increases in order to cover all directions.

Further, although a CRS is transmitted over a sharp three-dimensional directional beam similar to a data signal, for example, transmission of the CRS is not limited to this example. For example, the CRS may be transmitted over a directional beam in the horizontal direction and a directional beam in the vertical direction. An antenna gain when the CRS is transmitted over such two-dimensional directional beams is less than the antenna gain in a case in which the CRS is transmitted over the sharp three-dimensional directional beam.

(b) Data Signal

For example, a data signal and a DM-RS are transmitted over directional beams. When the number of multiplexed signals in the same resource block increases (i.e., the number of directional beams increases), for example, power allocated to each directional beam decreases. Conversely, when the number of multiplexed signals decreases, power allocated to each directional beam increases.

Note that directional beams of a data signal and a DM-RS are directional beams to a UE. Accordingly, the number of directional beams of a data signal and a DM-RS in the same resource block is smaller than the number of directional beams of a CRS.

(2) Difference Between Measurement Result and Actual Received Power/Received Quality As described above, a CRS is also transmitted over directional beams similar to a data signal and a DM-RS signal. However, power allocated to one directional beam of a CRS may differ from power allocated to one directional beam of a data signal and a DM-RS. Accordingly, a measurement result of a CRS transmitted over directional beams (i.e., received power/received quality) may remarkably differ from actual received power/received quality of a data signal and a DM-RS transmitted over directional beams.

Specifically, for example, power allocated to one directional beam of a CRS and the measurement result of the CRS are different depending on the number of directional beams of the CRS. In addition, for example, the number of beams of a data signal and a DM-RS and received power/received quality of the data signal and the DM-RS are different depending on the number of directional beams of the data signal and DM-RS in a resource block. Accordingly, a measurement result of a CRS may remarkably differ from actual received power/received quality of a data signal and a DM-RS depending on the number of directional beams of the CRS and the number of beams of the data signal and the DM-RS.

Due to a difference between such a measurement result and actual received power/received quality, a cell selected on the basis of the measurement result may be an inappropriate cell. As an example, a UE which is RRC idle may select an undesirable cell in cell selection. As another example, an RRC-connected UE may perform handover to an undesirable cell in cell selection.

Therefore, it is desirable to provide a system which enables selecting a cell more appropriately when transmission is performed over directional beams.

<<2. Schematic Configuration of System>>

Figure 7:
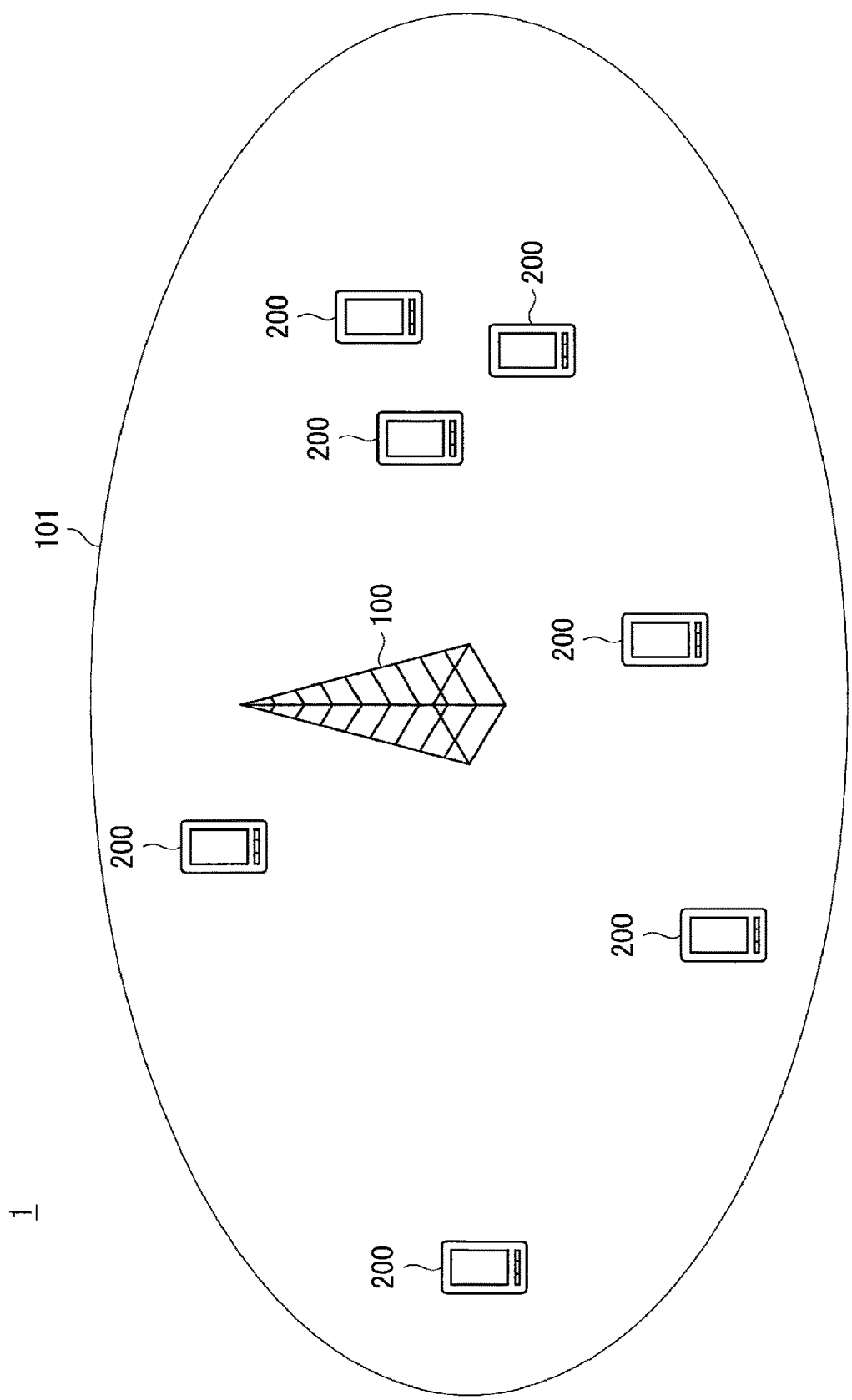
FIG. 7 is a diagram for describing an example of a schematic configuration of a system according to an embodiment of the present disclosure.

Next, a schematic configuration of a communication system 1 according to an embodiment of the present disclosure will be described with reference to FIG. 7. FIG. 7 is a diagram for describing an example of the schematic configuration of the communication system 1 according to an embodiment of the present disclosure. Referring to FIG. 7, the system 1 includes a base station 100 and terminal apparatuses 200. The system 1 is a system which complies with, for example, LTE, LTE-Advanced, or similar communication standards.

(Base Station 100)

The base station 100 performs wireless communication with the terminal apparatuses 200. For example, the base station 100 performs wireless communication with the terminal apparatuses 200 located in a cell 101 of the base station 100.

Particularly, in an embodiment of the present disclosure, the base station 100 performs beamforming. For example, the beamforming is beamforming of large-scale MIMO. The beamforming may also be referred to as beamforming of massive MIMO, beamforming of free dimension MIMO or three-dimensional beamforming. Specifically, for example, the base station 100 includes a directional antenna usable for large-scale MIMO and perforins beamforming of large-scale MIMO by multiplying a transmission signal by a weight set for the directional antenna.

In the embodiment of the present disclosure, particularly, the base station 100 transmits a reference signal for selecting a cell over directional beams. For example, the reference signal is a CRS.

(Terminal Apparatus 200)

The terminal apparatus 200 performs wireless communication with the base station 100. For example, the terminal apparatus 200 performs wireless communication with the base station 100 when located in the cell 101 of the base station 100.

<<3. Configuration of Each Apparatus>>

Figure 8:
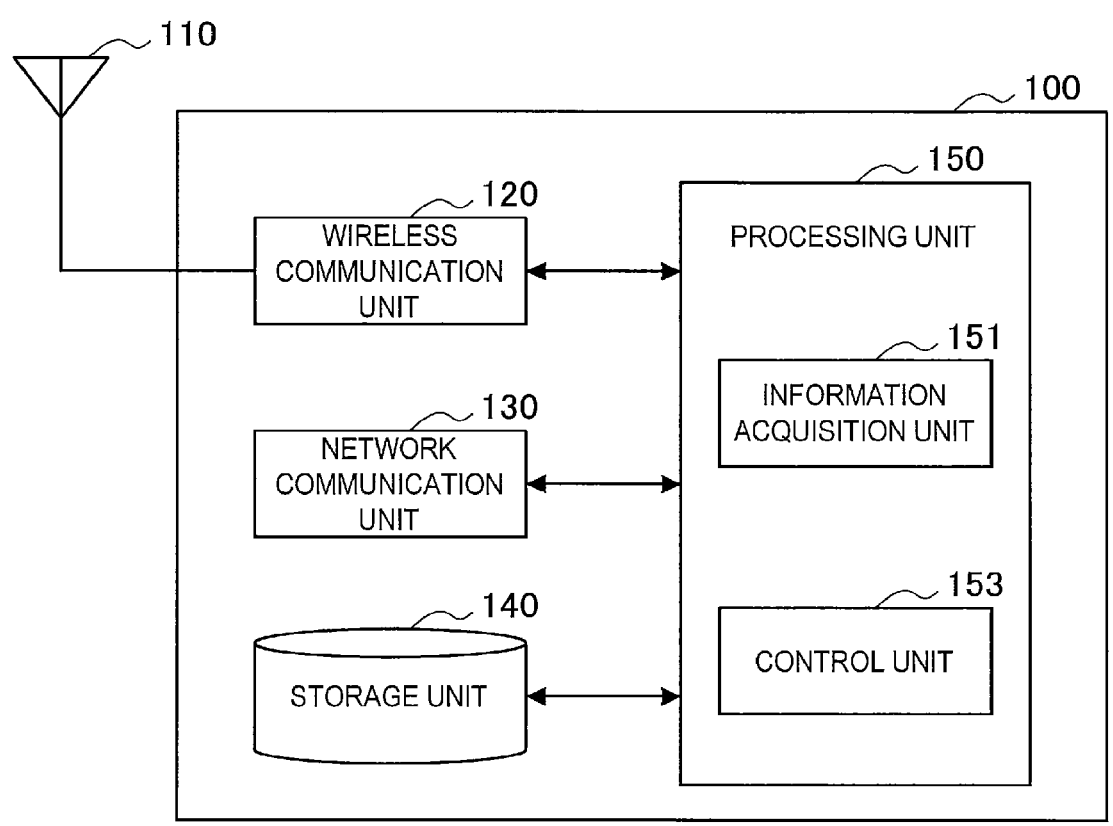
FIG. 8 is a block diagram showing an example of a configuration of a base station according to the embodiment.
Figure 9:
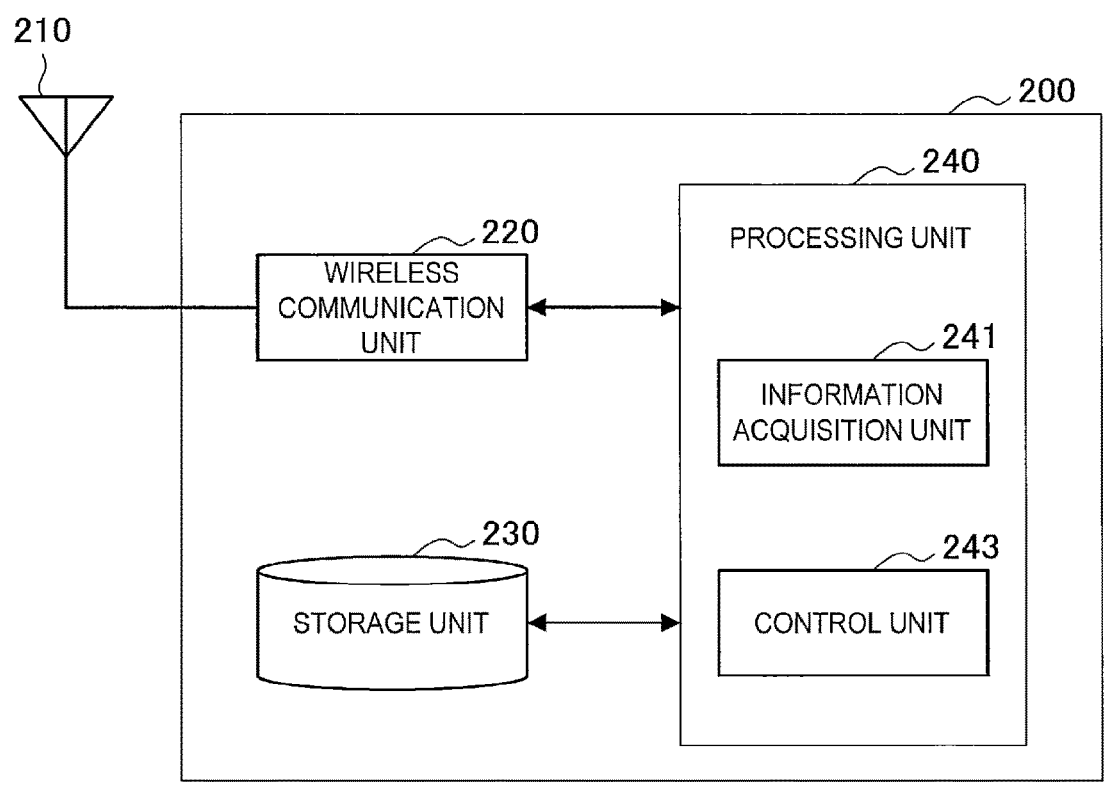
FIG. 9 is a block diagram showing an example of a configuration of a terminal apparatus according to the embodiment.

Next, examples of configurations of the base station 100 and the terminal apparatus 200 will be described with reference to FIGS. 8 and 9.

<3.1. Configuration of Base Station>

First of all, an example of the configuration of the base station 100 according to an embodiment of the present disclosure will be described with reference to FIG. 8. FIG. 8 is a block diagram showing an example of the configuration of the base station 100 according to the embodiment of the present disclosure. Referring to FIG. 8, the base station 100 includes an antenna unit 110, a wireless communication unit 120, a network communication unit 130, a storage unit 140, and a processing unit 150.

(Antenna Unit 110)

The antenna unit 110 radiates a signal output by the wireless communication unit 120, in the form of radio waves, into space. The antenna unit 110 also converts radio waves in space into a signal, and outputs the signal to the wireless communication unit 120.

For example, the antenna unit 110 includes a directional antenna. For example, the directional antenna is a directional antenna which can be used in large-scale MIMO.

(Wireless Communication Unit 120)

The wireless communication unit 120 transmits and receives signals. For example, the wireless communication unit 120 transmits a downlink signal to the terminal apparatus 200 and receives an uplink signal from the terminal apparatus 200.

(Network Communication Unit 130)

The network communication unit 130 transmits and receives information. For example, the network communication unit 130 transmits information to other nodes and receives information from other nodes. For example, the other nodes include other base stations and a core network node.

(Storage Unit 140)

The storage unit 140 stores programs and data for operation of the base station 100.

(Processing Unit 150)

The processing unit 150 provides various functions of the base station 100. The processing unit 150 includes an information acquisition unit 151 and a control unit 153. Note that the processing unit 150 may further include other components in addition to such components. That is, the processing unit 150 may perform operations other than operations of such components.

Specific operations of the information acquisition unit 151 and the control unit 153 will be described below in detail.

<3.2. Configuration of Terminal Apparatus>

Next, an example of the configuration of the terminal apparatus 200 according to an embodiment of the present disclosure will be described with reference to FIG. 9. FIG. 9 is a block diagram for showing an example of the configuration of the terminal apparatus 200 according to the embodiment of the present disclosure. Referring to FIG. 9, the terminal apparatus 200 includes an antenna unit 210, a wireless communication unit 220, a storage unit 230 and a processing unit 240.

(Antenna Unit 210)

The antenna unit 210 radiates a signal output by the wireless communication unit 220, in the form of radio waves, into space. The antenna unit 210 also converts radio waves in space into a signal, and outputs the signal to the wireless communication unit 220.

(Wireless Communication Unit 220)

The wireless communication unit 220 transmits and receives signals. For example, the wireless communication unit 220 receives a downlink signal from the base station 100 and transmits an uplink signal to the base station 100.

(Storage Unit 230)

The storage unit 230 stores a program and data for operation of the terminal apparatus 200.

(Processing Unit 240)

The processing unit 240 provides various functions of the terminal apparatus 200. The processing unit 240 includes an information acquisition unit 241 and a control unit 243. Note that the processing unit 240 may further include other components in addition to such components. That is, the processing unit 240 may also perform operations other than operations of such components.

Specific operations of the information acquisition unit 241 and the control unit 243 will be described below in detail.

<<4. First Embodiment>>

Next, a first embodiment will be described with reference to FIGS. 10 to 15.

<4.1. Technical Features>

First of all, technical features according to the first embodiment will be described with reference to FIGS. 10 to 13.

In the first embodiment, the base station 100 (information acquisition unit 151) acquires information (referred to hereinafter as "correction information") for correcting a result of measurements of a reference signal which is used for selecting a cell and transmitted over a plurality of directional beams in different directions (referred to hereinafter as "reference signal for selection"). Then, the base station 100 (control unit 153) notifies the terminal apparatus 200 of the correction information.

Further, in the first embodiment, the terminal apparatus 200 (information acquisition unit 241) acquires the correction information. Then, the terminal apparatus 200 (information acquisition unit 243) corrects the result of measurements of the reference signal for selection on the basis of the correction information.

(1) Reference Signal for Selection

For example, the reference signal for selection is a cell-specific reference signal (CRS).

(2) Transmission of Reference Signal for Selection

For example, the base station 100 (control unit 153) transmits the reference signal for selection through the plurality of directional beams.

For example, the base station 100 (control unit 153) multiplies the reference signal for selection by a plurality of different weight sets. Accordingly, for example, the base station 100 transmits the reference signal for selection over a plurality of different directional beams corresponding to the plurality of weight sets.

(3) Measurements of Reference Signal for Selection

For example, the terminal apparatus (control unit 153) performs measurements of the reference signal for selection transmitted over the plurality of directional beams.

For example, the measurements are measurements of received power and/or received quality of the reference signal for selection. More specifically, the measurements are radio resource control (RRC) measurements, and more specifically, measurements of RSRP and/or RSRQ, for example.

(4) Plurality of Directional Beams (a) First Example

For example, the plurality of directional beams are directional beams of large-scale MIMO. In other words, the plurality of directional beams are three-dimensional beams. Specifically, the plurality of directional beams are directional beams, for example, having directivity in both the horizontal direction and the vertical direction.

(b) Second Example

The plurality of directional beams may be directional beams having directivity in one of two directions orthogonal to each other. In other words, the plurality of directional beams may be two-dimensional beams.

Specifically, the two directions may be the horizontal direction and the vertical direction. That is, the plurality of directional beams may be beams having directivity in the horizontal direction or beams having directivity in the vertical direction. For example, the reference signal for selection transmitted in a certain radio resources (e.g., resource elements) may be transmitted over directional beams having directivity in the horizontal direction and the reference signal for selection transmitted in another radio resource (e.g., another resource element) may be transmitted over directional beams having directivity in the vertical direction.

Note that first measurement of the reference signal for selection transmitted over directional beams having directivity in the horizontal direction and second measurement of the reference signal for selection transmitted over directional beams having directivity in the vertical direction may be performed. Further, a result of measurements in the horizontal direction and the vertical direction may be generated from a result of the first measurement and a result of the second measurement.

Accordingly, for example, the number of directional beams of the reference signal for selection can be suppressed.

(5) Correction Information

For example, the correction information is information for correcting the result of the measurements by a difference between an amount corresponding to power allocated to directional beams of the reference signal for selection and an amount corresponding to power allocated to directional beams of a reference signal for demodulating a data signal (referred to hereinafter as "reference signal for demodulation").

(a) Reference Signal for Demodulation

For example, the reference signal for demodulation is a user-specific reference signal or a demodulation reference signal (DM-RS).

Note that the reference signal for demodulation is transmitted over the same directional beams as those of a data signal (directional beams in the same direction allocated the same power).

(b) Difference in Amounts Corresponding to Power

As an example, the amount corresponding to the power is an amount of power reduction per beam. That is, the correction information is information for correcting the result of the measurements (e.g., RSRP and/or RSRQ) by a difference between a power reduction amount per beam with respect to the reference signal for selection and a power reduction amount (e.g., mean, expectation or maximum value) per beam with respect to the reference signal for demodulation. A specific example of which will be described with reference to FIG. 10.

FIG. 10 is a diagram for describing an example of a relationship between the number of beams and a power reduction amount per beam. Referring to FIG. 10, the number of beams and a power reduction amount per beam are shown. For example, the power reduction amount is −3.01 dB when the number of beams is 2 and the power reduction amount is −12.04 dB when the number of beams is 16 while the power reduction amount is 0 dB when the number of beams is 1. For example, a CRS is transmitted over 16 directional beams and four DM-RSs are transmitted over an average (or maximum) of four directional beams in one resource block. In this case, a power reduction amount per beam with respect to a CRS is −12.04 dB and a power reduction amount per beam with respect to a DM-RS is −6.02 dB. The correction information is information for correcting RSRP and/or RSRQ by 6.02 dB (=−6.02 dB−(−12.04 dB)).

Note that the amount corresponding to the power is not limited to the power reduction amount per beam and may be another amount (e.g., power itself).

(c) Specific Example of Correction Information (c-1) First Example

As a first example, the correction information is information indicating the difference (i.e., the difference between the amount corresponding to power allocated to directional beams of the reference signal for selection and the amount corresponding to power allocated to directional beams of the reference signal for demodulation).

As described above, for example, the amount corresponding to the power is a power reduction amount per beam. In this case, for example, the correction information is information indicating a difference between a power reduction amount per beam with respect to the reference signal for selection and a power reduction amount (e.g., mean, expectation or maximum value) per beam with respect to the reference signal for demodulation. As a specific example, the correction information is information indicating 6.02 dB, for example, as described with reference to FIG. 10.

For example, the correction information is an index indicating the difference. A specific example of this will be described with reference to FIG. 11.

FIG. 11 is a diagram for describing an example of correction information. Referring to FIG. 11, indexes and power reduction amount difference per beam are shown. In this way, for example, a plurality of differences of power reduction amount per beam are decided and each index indicates one of the plurality of differences corresponding thereto. For example, index 0 indicates 0 dB and index 4 indicates 12.04 dB. The correction information is one of a plurality of indexes and indicates one of the plurality of differences. Note that information indicating such a relationship between the index and the power reduction amount difference is stored in the base station 100 and the terminal apparatus 200.

It is possible to easily correct, for example, a result of measurements of the reference signal for selection using such correction information.

(c-2) Second Example

As a second example, the correction information may include information related to power allocated to directional beams of the reference signal for selection (referred to hereinafter as "first power related information"). Further, the correction information may include information related to power allocated to directional beams of the reference signal for demodulation (referred to hereinafter as "second power related information").

As an example, the first power related information may be information indicating the power reduction amount per beam with respect to the reference signal for selection and the second power related information may be information indicating the power reduction amount (e.g., mean, expectation or maximum value) per beam with respect to the reference signal for demodulation. As a specific example, the first power related information may be information indicating −12.04 dB and the second power related information may be information indicating −6.02 dB as described with reference to FIG. 10.

For example, the first power related information and the second power related information may be indexes indicating amounts of power reduction. A specific example of this will be described with reference to FIG. 12.

FIG. 12 is a diagram for describing an example of the first power related information and the second power related information included in the correction information. Referring to FIG. 12, indexes and power reduction amounts per beam are shown. In this manner, for example, amounts of a plurality of power reduction per beam are decided and each index indicates one of the amounts of the plurality of power reduction corresponding thereto. For example, index 0 indicates 0 dB (which is a power reduction amount in a case in which the number of beams of a reference signal is 1). Further, index 4 indicates −12.04 dB (which is a power reduction amount in a case in which the number of beams of the reference signal is 16). The first power related information is one of a plurality of indexes and indicates the amount of one of the plurality of power reduction. Similarly, the second power related information is one of the plurality of indexes and indicates the amount of one of the plurality of power reduction. Note that information indicating such a relationship between the indexes and the power reduction amounts is stored in the base station 100 and the terminal apparatus 200.

It is possible to calculate, for example, a correction value using such correction information (the first power related information and the second power related information) and correct a result of measurements of the reference signal for selection using the correction value.

(c-3) Third Example

As a third example, the correction information may include information indicating the number of directional beams of the reference signal for selection (referred to hereinafter as "first beam number information"). Further, the correction information may include information indicating the number of directional beams of the reference signal for demodulation (referred to hereinafter as "second beam number information"). The second beam number information may be the number (e.g., mean, expectation or maximum value) of directional beams of the reference signal for demodulation per resource block.

As a specific example, the first beam number information may be information indicating 16 and the second beam number information may be information indicating 4 as described with reference to FIG. 10.

For example, the first beam number information and the second beam number information may be indexes indicating the numbers of beams. A specific example of this will be described with reference to FIG. 13.

FIG. 13 is a diagram for describing an example of the first beam number information and the second beam number information included in the correction information. Referring to FIG. 13, indexes and the numbers of beams are shown. In this manner, for example, the number of a plurality of beams are decided and each index indicates one corresponding thereof of the numbers of the plurality of beams. For example, index 0 indicates 1. Further, index 4 indicates 16. The first index number information is one of a plurality of indexes and indicates one of the plurality of numbers of beams. Similarly, the second beam number information is one of the plurality of indexes and indicates one of the plurality of numbers of beams. Note that information indicating such a relationship between the indexes and the numbers of beams and information indicating the relationship between the numbers of beams and the power reduction amounts, as shown in FIG. 10, are stored in the base station 100 and the terminal apparatus 200.

Note that the terminal apparatus 200 can obtain a power reduction amount from the number of beams.

It is possible to calculate, for example, a correction value using such correction information (the first beam number information and the second beam number information) and correct a result of measurements of the reference signal for selection using the correction value.

(d) Adjacent Base Station
(d-1) First Example

As a first example, the correction information is first correction information for correcting a result of measurements of the reference signal for selection transmitted by the base station 100. That is, the base station 100 (control unit 153) notifies the terminal apparatus 200 of the first correction information. For example, the base station 100 notifies the terminal apparatus 200 of the first correction information in system information, as will be described below.

Meanwhile, for example, a neighbor base station of the base station 100 notifies the terminal apparatus 200 of second correction information for correcting a result of measurements of the reference signal for selection transmitted by the neighbor base station. For example, the neighbor base station notifies the terminal apparatus 200 of the second correction information in the system information.

Accordingly, the terminal apparatus 200 can correct not only a measurement result of the base station 100 but also a measurement result of the neighbor base station of the base station 100, for example.

Accordingly, it is not necessary to transmit and receive the second correction information between the base station 100 and the neighbor base station, for example.

(d-2) Second Example

As a second example, the correction information may include the first correction information and the second correction information. That is, the base station 100 (control unit 153) may notify the terminal apparatus 200 of the first correction information and the second correction information. As will be described below, the base station 100 may notify the terminal apparatus 200 of the first correction information and the second correction information in system information or notify the terminal apparatus 200 of the first correction information and the second correction information through individual signaling to the terminal apparatus 200.

The second correction information may be information transmitted to the base station 100 by the neighbor base station. That is, the neighbor base station may transmit the second correction information to the base station 100 (for example, through an X2 interface).

Accordingly, it is possible to reduce, for example, the burden of the terminal apparatus 200 concerning acquisition of the correction information.

(e) Generation of Correction Information

For example, the base station 100 generates the first correction information. Further, for example, the neighbor base station generates the second correction information.

(6) Notification
(a) System Information

For example, the base station 100 (control unit 153) notifies the terminal apparatus 200 of the correction information in system information. For example, the system information is a system information block (SIB).

For example, the base station 100 (control unit 153) generates system information including the correction information. Then, the base station 100 transmits the system information.

Accordingly, for example, not only the terminal apparatus 200 in a connected (e.g., RRC connected) state but also the terminal apparatus 200 in an idle (e.g., RRC idle) state can acquire the correction information. Consequently, cell selection is appropriately performed. In addition, for example, not only the terminal apparatus 200 connected to the base station 100 but also the terminal apparatus 200 connected to the neighbor base station can acquire the correction information. As a result, handover to the base station 100 is appropriately performed.

(b) Signaling

The base station 100 (control unit 153) may notify the terminal apparatus 200 of the correction information through individual signaling to the terminal apparatus 200. The signaling may be RRC signaling.

For example, the base station 100 (control unit 153) may generate a signaling message (e.g., an RRC message) including the correction information. Then, the base station 100 may transmit the signaling message to the terminal apparatus 200.

Accordingly, it is possible to transmit the correction information according to the individual terminal apparatus 200, for example.

(7) Correction

As described above, the terminal apparatus 200 (information acquisition unit 241) acquires the correction information. Then, the terminal apparatus 200 (control unit 243) corrects a result of measurements of the reference signal for selection on the basis of the correction information.

Specifically, referring again to FIG. 10, the correction information is information for correcting RSRP and/or RSRQ, for example, by 6.02 dB (e.g., information indicating 6.02 dB) and the terminal apparatus 200 corrects RSRP and/or RSRQ which is a result of measurements by adding 6.02 dB to RSRP and/or RSRQ. For example, when RSRP before correction is −80 dBm, RSRP after correction is −73.90 dBm. For example, when RSRQ before correction is 10 dB, RSRQ after correction is 16.02 dB.

Further, the terminal apparatus 200 (information acquisition unit 241) acquires the first correction information and the second correction information, for example. Then, the terminal apparatus 200 (control unit 243) corrects the result of measurements of the reference signal for selection transmitted by the base station 100 on the basis of the first correction information. Also, the terminal apparatus 200 (control unit 243) corrects the result of measurements of the reference signal for selection transmitted by the neighbor base station on the basis of the second correction information.

As described above, for example, the first correction information is information of which the terminal apparatus 200 is notified by the base station 100, and the second correction information is information of which the terminal apparatus 200 is notified by the neighbor base station. Alternatively, the first correction information and the second correction information may be information of which the terminal apparatus 200 is notified by the base station 100.

Note that the terminal apparatus 200 (control unit 243) reports measurements to the base station 100 on the basis of the result of corrected measurements.

As described above, the base station 100 notifies the terminal apparatus 200 of the correction information and the terminal apparatus 200 corrects a result of measurements of the reference signal for selection on the basis of the correction information. Accordingly, it is possible to more appropriately select a cell when transmission over directional beams is performed, for example. More specifically, even when power allocated to directional beams of the reference signal for selection has become different from power allocated to direction beams of the reference signal for demodulation (i.e., power of directional beams of a data signal) depending on the number of beams, a result of measurements is appropriately corrected. An appropriate cell can be selected on the basis of the corrected result of measurements in cell selection by the terminal apparatus 200 or handover decision by the base station 100.

<4.2. Processing Flow>

Next, an example of a process according to the first embodiment will be described with reference to FIGS. 14 and 15.

(1) First Example

Figure 14:
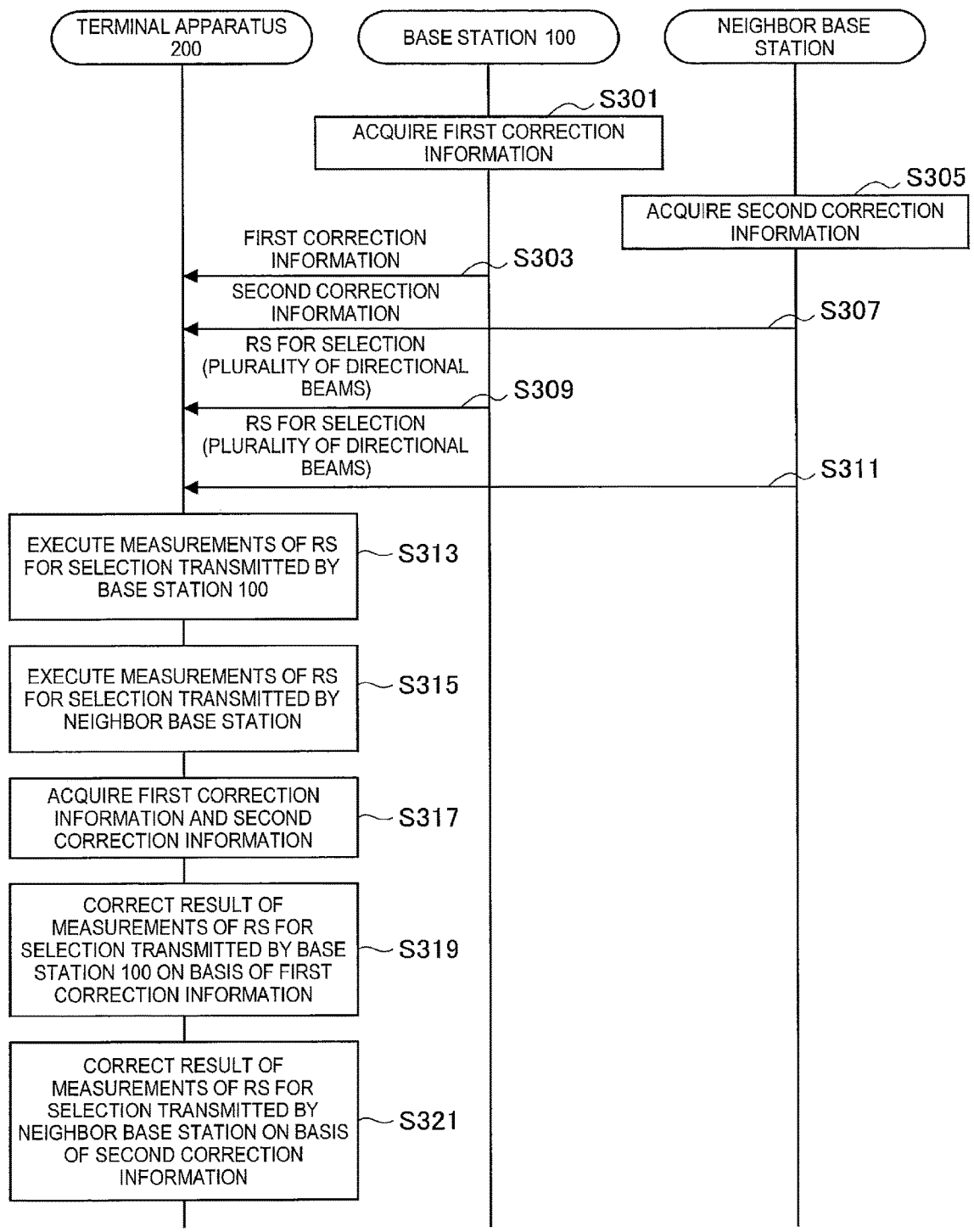
FIG. 14 is a sequence diagram showing a first example of a schematic flow of a process according to a first embodiment.

FIG. 14 is a sequence diagram showing a first example of a schematic flow of a process according to the first embodiment.

The base station 100 acquires first correction information for correcting a result of measurements of a reference signal for selection (e.g., a CRS) transmitted over a plurality of directional beams by the base station 100 (S301). For example, the base station 100 generates and acquires the first correction information. Then, the base station 100 notifies the terminal apparatus 200 of the first correction information. For example, the base station 100 notifies the terminal apparatus 200 of the first correction information in system information (or through individual signaling to the terminal apparatus 200) (S303).

A neighbor base station acquires second correction information for correcting a result of measurements of a reference signal for selection (e.g., a CRS) transmitted over a plurality of directional beams by the neighbor base station (S305). For example, the neighbor base station generates and acquires the second correction information. Then, the neighbor base station notifies the terminal apparatus 200 of the second correction information. For example, the neighbor base station notifies the terminal apparatus 200 of the second correction information in system information (S307).

The base station 100 transmits the reference signal for selection over a plurality of directional beams (S309). The neighbor base station also transmits the reference signal for selection over the plurality of directional beams (S311).

The terminal apparatus 200 performs measurements of the reference signal for selection transmitted by the base station 100 (e g , measurements of RSRP and/or RSRQ) (S313). Further, the terminal apparatus 200 performs measurements of the reference signal for selection transmitted by the neighbor base station (e.g., measurements of RSRP and/or RSRQ) (S315).

The terminal apparatus 200 acquires the first correction information and the second correction information (S317). Then, the terminal apparatus 200 corrects a result of the measurements of the reference signal for selection transmitted by the base station 100 on the basis of the first correction information (S319). In addition, the terminal apparatus 200 corrects the result of the measurements of the reference signal for selection transmitted by the neighbor base station on the basis of the second correction information (S321).

Note that the terminal apparatus 200 performs measurement report to the base station 100 on the basis of the corrected result of the measurements when the terminal apparatus 200 is in a corrected state. Then, the base station 100 may decide handover with respect to the terminal apparatus 200 when measurement report has been performed. Meanwhile, when the terminal apparatus 200 is in an idle state, the terminal apparatus 200 performs cell selection on the basis of the corrected result of the measurements.

(2) Second Example

Figure 15:
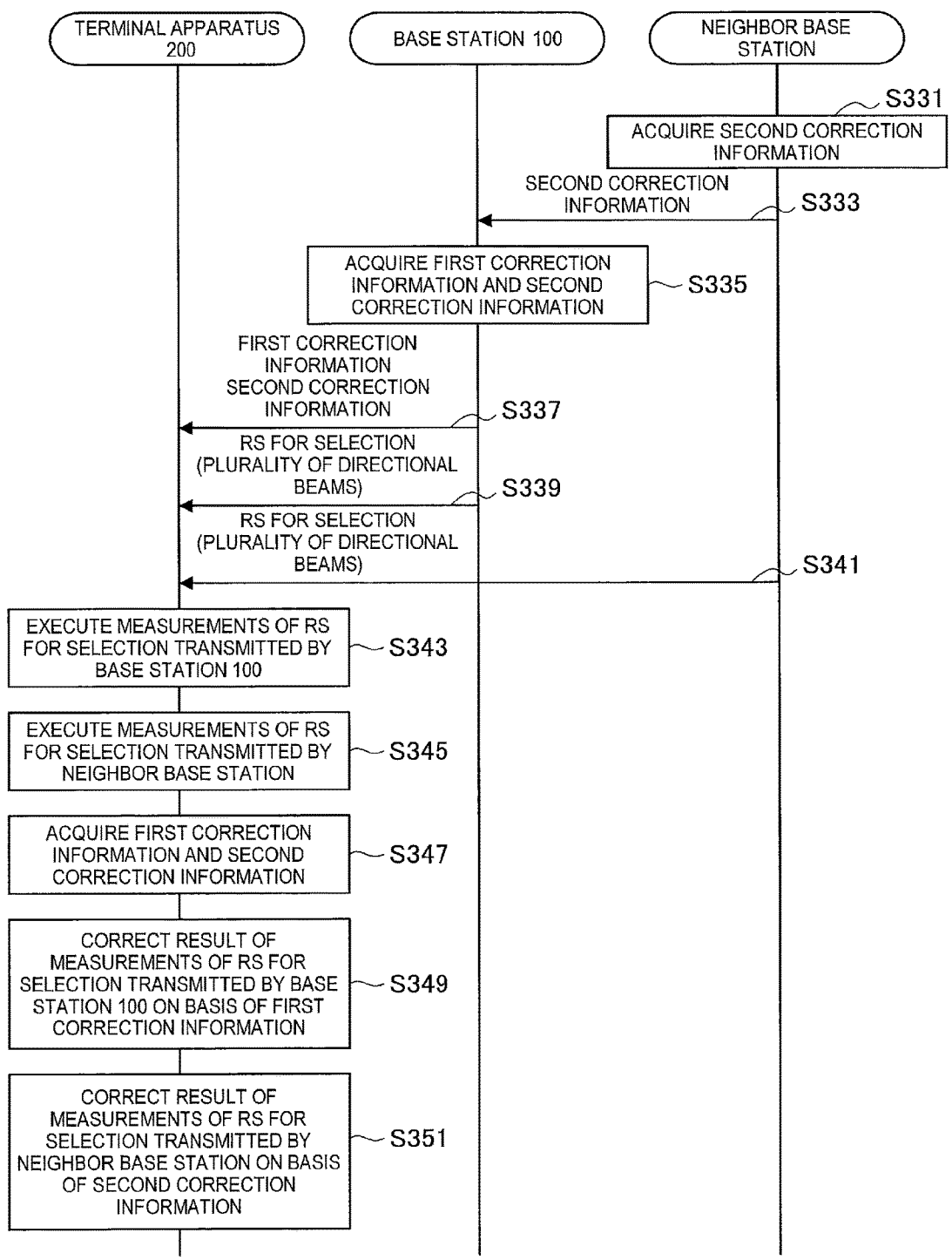
FIG. 15 is a sequence diagram showing a second example of a schematic flow of the process according to the first embodiment.

FIG. 15 is a sequence diagram showing a second example of a schematic flow of the process according to the first embodiment. Here, description of steps S339 to S351 in the example of FIG. 15 is the same as description of steps S309 to 321 in the example of FIG. 14. Accordingly, redundant description will be omitted and only steps S331 to S337 will be described here.

A neighbor base station acquires second correction information for correcting a result of measurements of a reference signal for selection (e.g., a CRS) transmitted over a plurality of directional beams by the neighbor base station (S331). For example, the neighbor base station generates and acquires the second correction information. Then, the neighbor base station transmits the second correction information to the base station 100 (for example, through an X2 interface). (S333).

The base station 100 acquires first correction information for correcting a result of measurements of a reference signal for selection (e.g., a CRS) transmitted over a plurality of directional beams by the base station 100, and the second correction information (S335). For example, the base station 100 generates and acquires the first correction information. Then, the base station 100 notifies the terminal apparatus 200 of the first correction information and the second correction information. For example, the base station 100 notifies the terminal apparatus 200 of the first correction information and the second correction information in system information (or through individual signaling to the terminal apparatus 200) (S337).

<<5. Second Embodiment>>

Figure 16:
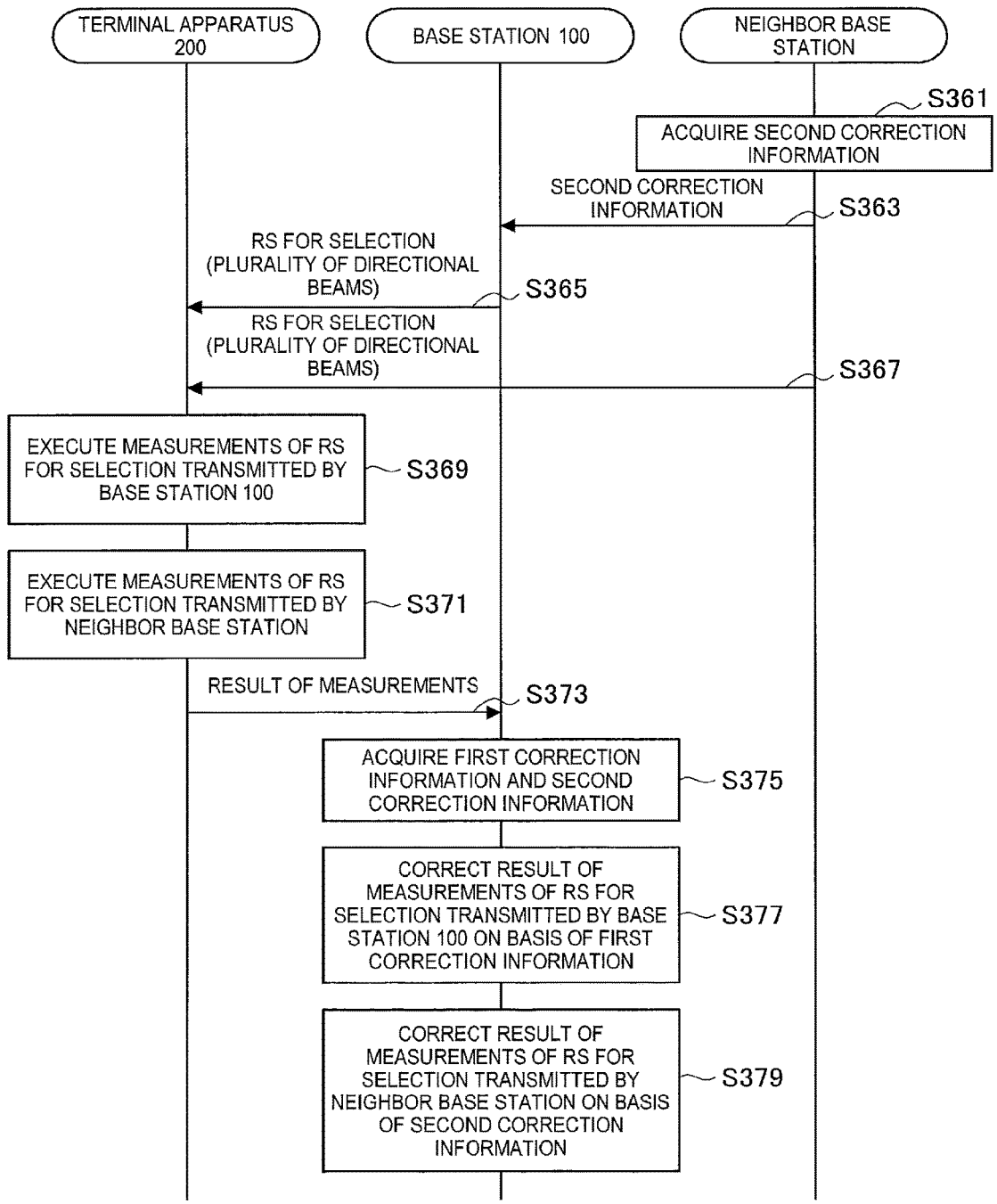
FIG. 16 is a sequence diagram showing an example of a schematic flow of a process according to a second embodiment.

Next, a second embodiment will be described with reference to FIG. 16.

In the above-described first embodiment, the base station 100 notifies the terminal apparatus 200 of correction information and the terminal apparatus 200 corrects a result of measurements of a reference signal for selection. In the second embodiment, conversely, the base station 100 corrects a result of measurements of a reference signal for selection on the basis of correction information.

<5.1. Technical Features>

First of all, technical features according to the second embodiment will be described.

In the second embodiment, the base station 100 (information acquisition unit 151) acquires information (i.e., correction information) for correcting a result of measurements of a reference signal (i.e., a reference signal for selection) which is used to select a cell and is transmitted over a plurality of directional beams in different directions. Then, the base station 100 (control unit 153) corrects a result of measurements of the reference signal for selection on the basis of the correction information.

Descriptions of "(1) reference signal for selection," "(2) transmission of reference signal for selection" and "(4) a plurality of directional beams" are identical in the first embodiment and the second embodiment. Accordingly, redundant description will be omitted here.

In addition, description of "(3) measurements of reference signal for selection" is also substantially identical in the first embodiment and the second embodiment. However, the terminal apparatus 200 performs measurement report to the base station 100 on the basis of a result of measurements of the reference signal for selection transmitted over the plurality of directional beams, particularly, in the second embodiment. That is, the terminal apparatus 200 reports the result of the measurements to the base station 100 when an event triggering measurement report is generated.

(5) Correction Information

For example, the correction information is information for correcting the result of the measurements by a difference between an amount corresponding to power allocated to directional beams of the reference signal for selection and an amount corresponding to power allocated to directional beams of a reference signal for demodulating a data signal (i.e., a reference signal for demodulation).

Here, descriptions of "(a) reference signal for demodulation," "(b) difference between amounts corresponding to powers" and "(e) generation of correction information" are identical in the first embodiment and the second embodiment. Accordingly, redundant description will be omitted here.

Description of "(c) specific example of correction information" is also substantially identical in the first embodiment and the second embodiment. In the second embodiment, however, the correction information may not be an index that indirectly indicates a power reduction amount difference, a power reduction amount, the number of beams or the like and may be a value that directly indicates a power reduction amount difference, a power reduction amount, the number of beams or the like.

(d) Adjacent Base Station

For example, the correction information includes first correction information for correcting a result of measurements of the reference signal for selection transmitted by the base station 100 and second correction information for correcting a result of measurements of the reference signal for selection transmitted by a neighbor base station of the base station 100.

For example, the second correction information is information transmitted to the base station 100 by the neighbor base station. That is, the neighbor base station transmits the second correction information to the base station 100 (for example, through an X2 interface).

Accordingly, it is possible to correct a result of measurements of the reference signal for selection transmitted by the neighbor base station, for example.

(6) Correction

As described above, the base station 100 (information acquisition unit 151) acquires the correction information. Then, the base station 100 (control unit 153) corrects a result of measurements of the reference signal for selection on the basis of the correction information. The result of the measurements is reported to the base station 100 by the terminal apparatus 200.

Specifically, referring again to FIG. 10, the correction information is information for correcting RSRP and/or RSRQ, for example, by 6.02 dB (e.g., information indicating 6.02 dB) and the base station 100 corrects RSRP and/or RSRQ which is a result of measurements by adding 6.02 dB to RSRP and/or RSRQ.

In addition, for example, the base station 100 (control unit 153) corrects a result of measurements of the reference signal for selection transmitted by the base station 100 on the basis of the first correction information. Further, the base station 100 (control unit 153) corrects a result of measurements of the reference signal for selection transmitted by the neighbor base station on the basis of the second correction information.

As described above, the base station 100 corrects a result of measurements of the reference signal for selection on the basis of the correction information. Accordingly, it is possible to more appropriately select a cell when transmission over directional beams is performed, for example.

<5.2. Processing Flow>

Next, an example of a process according to the second embodiment will be described with reference to FIG. 16. FIG. 16 is a sequence diagram showing an example of a schematic flow of the process according to the second embodiment.

A neighbor base station acquires second correction information for correcting a result of measurements of a reference signal for selection (e.g., a CRS) transmitted over a plurality of directional beams by the neighbor base station (S361). For example, the neighbor base station generates and acquires the second correction information. Then, the neighbor base station transmits the second correction information to the base station 100 (for example, through an X2 interface) (S363).

The base station 100 transmits a reference signal for selection over a plurality of directional beams (S365). The neighbor base station also transmits a reference signal for selection through a plurality of directional beams (S367).

The terminal apparatus 200 performs measurements (e g , measurements of RSRP and/or RSRQ) of the reference signal for selection transmitted by the base station 100 (S369). Further, the terminal apparatus 200 performs measurements (e.g., measurements of RSRP and/or RSRQ) of the reference signal for selection transmitted by the neighbor base station (S371). Then, the terminal apparatus 200 performs measurements report (S373).

The base station 100 acquires first correction information for correcting a result of measurements of a reference signal for selection (e.g., a CRS) transmitted over a plurality of directional beams by the base station 100 and the second correction information (S375). For example, the base station 100 generates and acquires the first correction information. Then, the base station 100 corrects a result of the measurements of the reference signal for selection transmitted by the base station 100 on the basis of the first correction information (S377). In addition, the base station 100 corrects a result of the measurements of the reference signal for selection transmitted by the neighbor base station on the basis of the second correction information (S379).

Note that the base station 100 may perform handover decision on the basis of the corrected result of the measurements.

<<6. Application Examples>>

The technique according to the present disclosure is applicable to various products. The base station 100 may also be implemented, for example, as any type of evolved Node B (eNB) such as macro eNBs and small eNBs. Small eNBs may cover smaller cells than the macrocells of pico eNBs, micro eNBs, or home (femt) eNBs. Instead, the base station 100 may be implemented as another type of base station such as Nodes B or base transceiver stations (BTSs). The base station 100 may include the main apparatus (which is also referred to as base station apparatus) that controls wireless communication and one or more remote radio heads (RRHs) that are disposed at different locations from that of the main apparatus. Also, various types of terminals described below may function as the base station 100 by temporarily or semi-permanently executing the functionality of the base station. Furthermore, at least some of components of the base station 100 may be realized in a base station apparatus or a module for a base station apparatus.

Further, the terminal apparatus 200 may be implemented as a mobile terminal such as smartphones, tablet personal computers (PCs), notebook PCs, portable game terminals, portable/dongle mobile routers, and digital cameras, or an in-vehicle terminal such as car navigation apparatuses. The terminal apparatus 200 may be implemented as a machine type communication (MTC) for establishing a machine to machine communication (M2M). Furthermore, at least some of components of the terminal apparatus 200 may be implemented as a module (e.g. integrated circuit module constituted with a single die) that is mounted on these terminals.

<6.1. Application Examples for Base Station>

(First Application Example)

Figure 17:
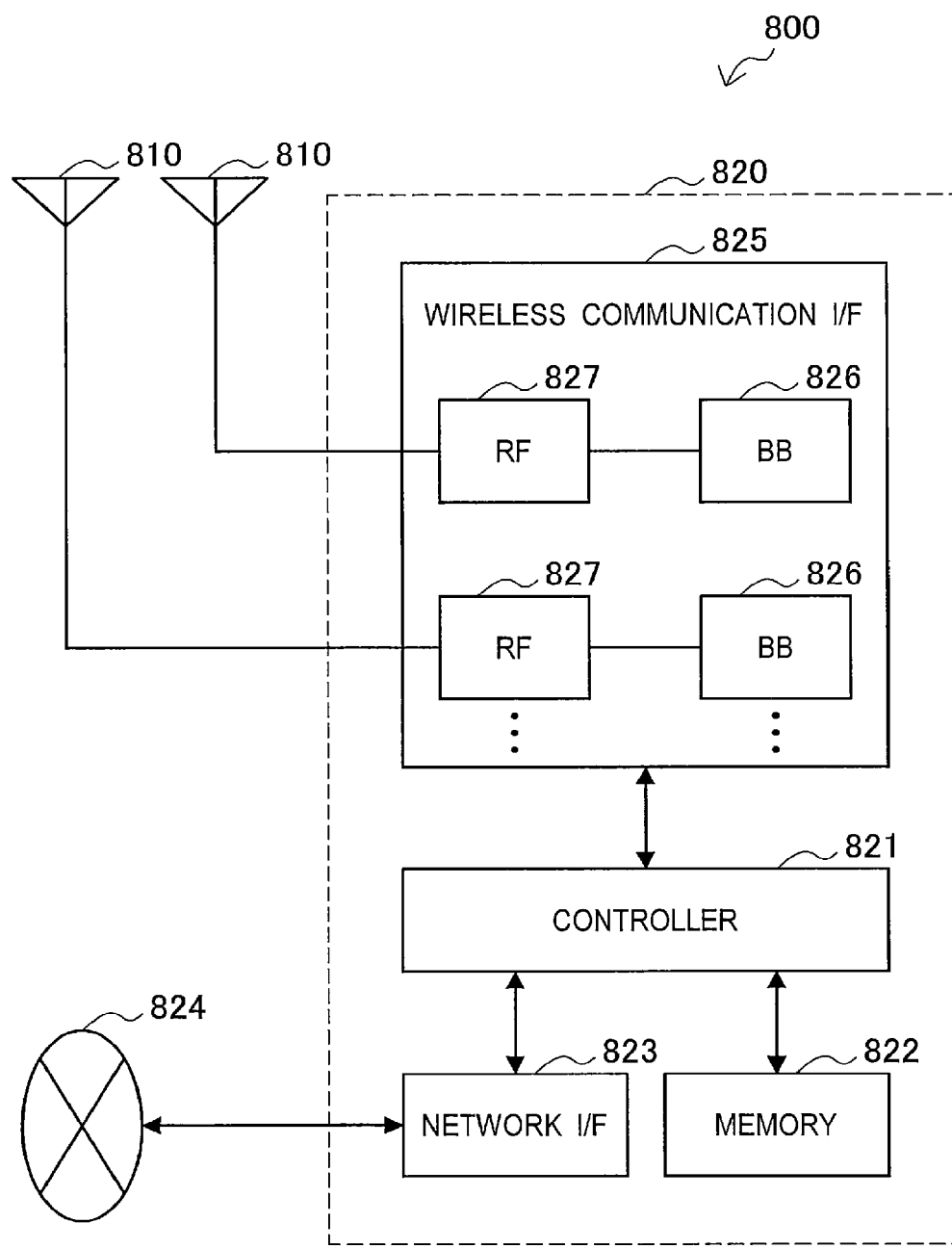
FIG. 17 is a block diagram illustrating a first example of a schematic configuration of an eNB.

FIG. 17 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g. a plurality of antenna elements constituting a MIMO antenna) and is used for the base station apparatus 820 to transmit and receive a wireless signal. The eNB 800 may include the plurality of the antennas 810 as illustrated in FIG. 17, and the plurality of antennas 810 may, for example, correspond to a plurality of frequency bands used by the eNB 800. It should be noted that while FIG. 17 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. The controller 821 may also have a logical function of performing control such as radio resource control, radio bearer control, mobility management, admission control, and scheduling. The control may be performed in cooperation with a surrounding eNB or a core network. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g. S1 interface or X2 interface). The network interface 823 may be a wired communication interface or a wireless communication interface for wireless backhaul. When the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826 and an RF circuit 827. The BB processor 826 may, for example, perform encoding/decoding, modulation/demodulation, multiplexing/demultiplexing, and the like, and performs a variety of signal processing on each layer (e.g. L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. The module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 17, and the plurality of BB processors 826 may, for example, correspond to a plurality of frequency bands used by the eNB 800. The wireless communication interface 825 may also include a plurality of the RF circuits 827, as illustrated in FIG. 17, and the plurality of RF circuits 827 may, for example, correspond to a plurality of antenna elements. FIG. 17 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 17, the information acquisition unit 151 and the control unit 153 described above with reference to FIG. 8 may be mounted in the wireless communication interface 825. Alternatively, at least some of the components may be mounted in the controller 821. As an example, the eNB 800 may be equipped with a module including some or all components of the wireless communication interface 825 (for example, the BB processor 826) and/or the controller 821, and the information acquisition unit 151 and the control unit 153 may be mounted in the module. In this case, the module may store a program causing the processor to function as the information acquisition unit 151 and the control unit 153 (that is, a program causing the processor to perform the operation of the information acquisition unit 151 and the control unit 153) and execute the program. As another example, the program causing the processor to function as the information acquisition unit 151 and the control unit 153 may be installed in the eNB 800, and the wireless communication interface 825 (for example, the BB processor 826) and/or the controller 821 may execute the program. As described above, the eNB 800, the base station apparatus 820, or the module may be provided as an apparatus including the information acquisition unit 151 and the control unit 153, and the program causing the processor to function as the information acquisition unit 151 and the control unit 153 may be provided. A readable recording medium in which the program is recorded may be provided.

In addition, in the eNB 800 shown in FIG. 17, the wireless communication unit 120 described with reference to FIG. 8 may be implemented by the wireless communication interface 825 (for example, the RF circuit 827). Moreover, the antenna unit 110 may be implemented by the antenna 810. In addition, the network communication unit 130 may be implemented by the controller 821 and/or the network interface 823.

(Second Application Example)

Figure 18:
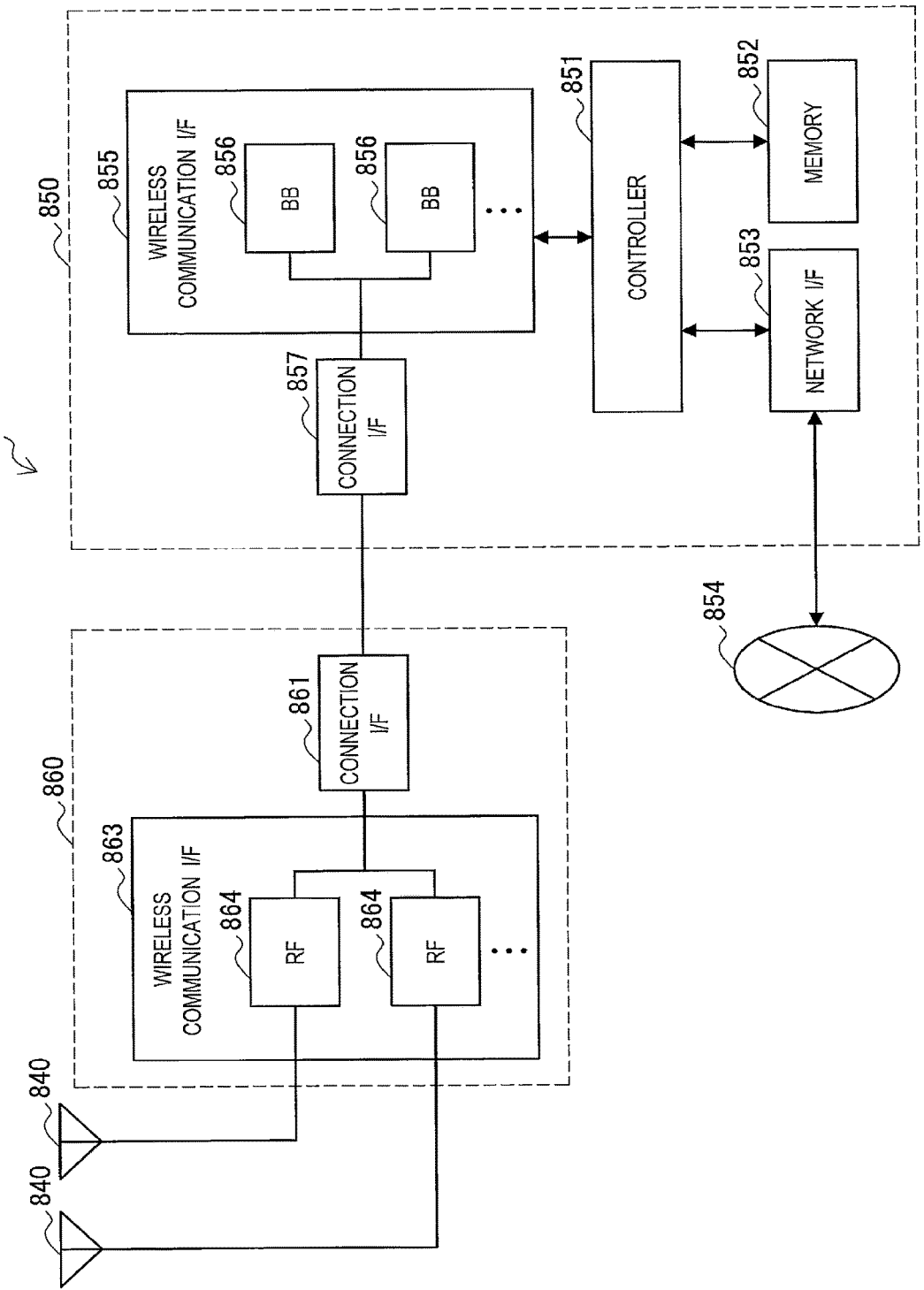
FIG. 18 is a block diagram illustrating a second example of the schematic configuration of the eNB.

FIG. 18 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. The base station apparatus 850 and the RRH 860 may be connected to each other by a high speed line such as optical fiber cables.

Each of the antennas 840 includes a single or a plurality of antenna elements (e.g. antenna elements constituting a MIMO antenna), and is used for the RRH 860 to transmit and receive a wireless signal. The eNB 830 may include a plurality of the antennas 840 as illustrated in FIG. 18, and the plurality of antennas 840 may, for example, correspond to a plurality of frequency bands used by the eNB 830. FIG. 18 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 17.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856. The BB processor 856 is the same as the BB processor 826 described with reference to FIG. 17 except that the BB processor 856 is connected to an RF circuit 864 of the RRH 860 via the connection interface 857. The wireless communication interface 855 may include a plurality of the BB processors 856, as illustrated in FIG. 18, and the plurality of BB processors 856 may, for example, correspond to a plurality of frequency bands used by the eNB 830 respectively. FIG. 18 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860 The connection interface 857 may be a communication module for communication on the high speed line which connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864. The RF circuit 864 may include a mixer, a filter, an amplifier and the like, and transmits and receives a wireless signal via the antenna 840. The wireless communication interface 863 may include a plurality of the RF circuits 864 as illustrated in FIG. 18, and the plurality of RF circuits 864 may, for example, correspond to a plurality of antenna elements. FIG. 18 illustrates an example in which the wireless communication interface 863 includes the plurality of RF circuits 864, but the wireless communication interface 863 may include the single RF circuit 864.

In the eNB 830 illustrated in FIG. 18, the information acquisition unit 151 and the control unit 153 described above with reference to FIG. 8 may be mounted in the wireless communication interface 855 and the wireless communication interface 863. Alternatively, at least some of the components may be mounted in the controller 851. As an example, the eNB 830 may be equipped with a module including some or all components of the wireless communication interface 855 (for example, the BB processor 856) and/or the controller 851, and the information acquisition unit 151 and the control unit 153 may be mounted in the module. In this case, the module may store a program causing the processor to function as the information acquisition unit 151 and the control unit 153 (that is, a program causing the processor to perform the operation of the information acquisition unit 151 and the control unit 153) and execute the program. As another example, the program causing the processor to function as the information acquisition unit 151 and the control unit 153 may be installed in the eNB 830, and the wireless communication interface 855 (for example, the BB processor 856) and/or the controller 851 may execute the program. As described above, the eNB 830, the base station apparatus 850, or the module may be provided as an apparatus including the information acquisition unit 151 and the control unit 153, and the program causing the processor to function as the information acquisition unit 151 and the control unit 153 may be provided. A readable recording medium in which the program is recorded may be provided.

In addition, in the eNB 830 shown in FIG. 18, the wireless communication unit 120 described with reference to FIG. 8 may be implemented by the wireless communication interface 863 (for example, the RF circuit 864). Moreover, the antenna unit 110 may be implemented by the antenna 840.

In addition, the network communication unit 130 may be implemented by the controller 851 and/or the network interface 853.

<6.2. Application Examples for Terminal Apparatus>
(First Application Example)

Figure 19:
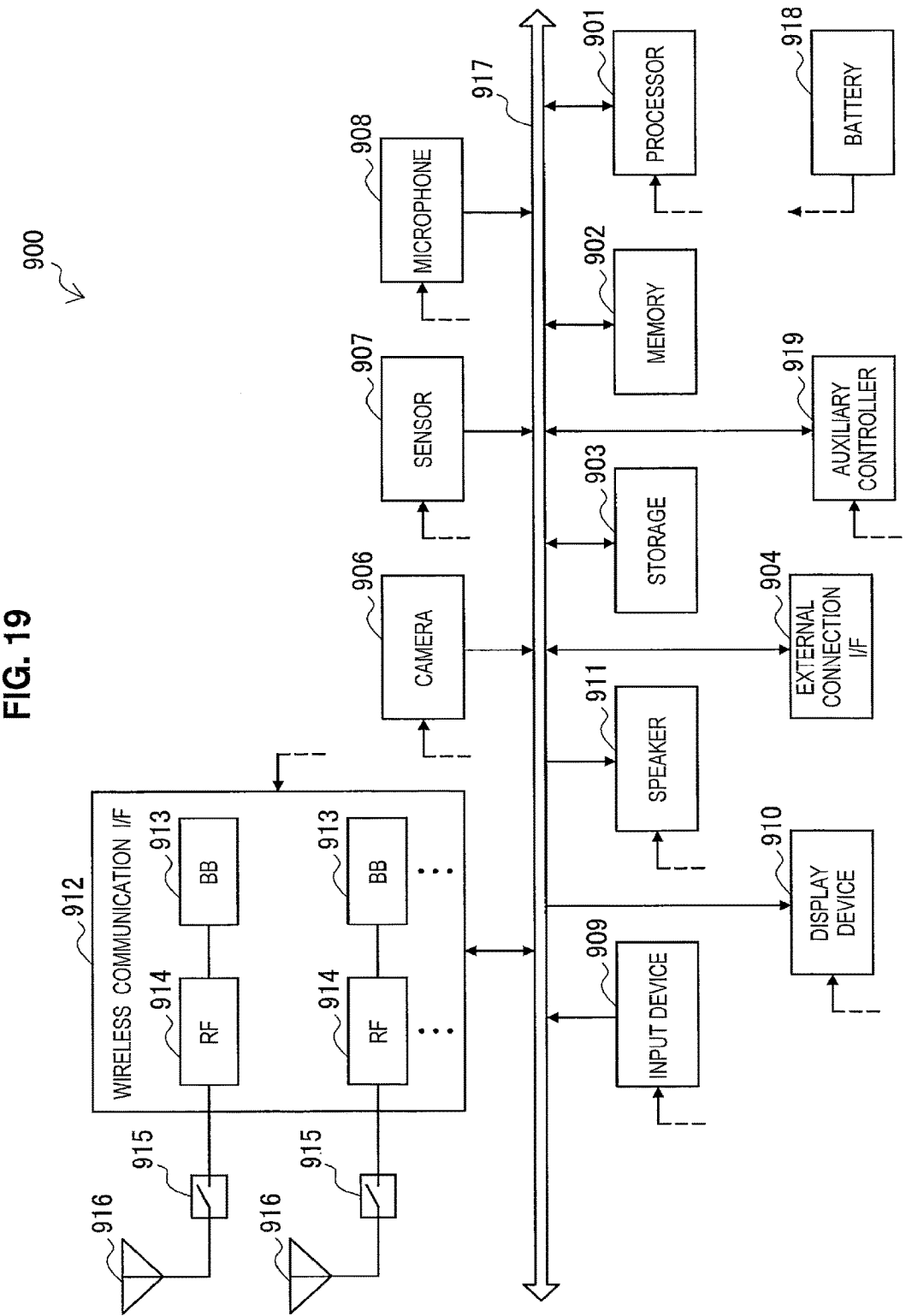
FIG. 19 is a block diagram illustrating an example of a schematic configuration of a smartphone.

FIG. 19 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and a secondary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, and an acceleration sensor. The microphone 908 converts a sound that is input into the smartphone 900 to an audio signal. The input device 909 includes, for example, a touch sensor which detects that a screen of the display device 910 is touched, a key pad, a keyboard, a button, or a switch, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 19. FIG. 19 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 19. FIG. 19 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the secondary controller 919 to each other. The battery 918 supplies electric power to each block of the smartphone 900 illustrated in FIG. 19 via a feeder line that is partially illustrated in the figure as a dashed line. The secondary controller 919, for example, operates a minimally necessary function of the smartphone 900 in a sleep mode.

In the smartphone 900 illustrated in FIG. 19, the information acquisition unit 241 and the control unit 243 described above with reference to FIG. 9 may be mounted in the wireless communication interface 912. Alternatively, at least some of the components may be mounted in the processor 901 or the secondary controller 919. As an example, the smartphone 900 may be equipped with a module including some or all components of the wireless communication interface 912 (for example, the BB processor 913), the processor 901, and/or the secondary controller 919, and the information acquisition unit 241 and the control unit 243 may be mounted in the module. In this case, the module may store a program causing the processor to function as the information acquisition unit 241 and the control unit 243 (that is, a program causing the processor to perform the operation of the information acquisition unit 241 and the control unit 243) and execute the program. As another example, the program causing the processor to function as the information acquisition unit 241 and the control unit 243 may be installed in the smartphone 900, and the wireless communication interface 912 (for example, the BB processor 913), the processor 901, and/or the secondary controller 919 may execute the program. As described above, the smartphone 900 or the module may be provided as an apparatus including the information acquisition unit 241 and the control unit 243, and the program causing the processor to function as the information acquisition unit 241 and the control unit 243 may be provided. A readable recording medium in which the program is recorded may be provided.

In addition, in the smartphone 900 shown in FIG. 19, the wireless communication unit 220 described with reference to FIG. 9 may be implemented by the wireless communication interface 912 (for example, the RF circuit 914). Moreover, the antenna unit 210 may be implemented by the antenna 916.

(Second Application Example)

Figure 20:
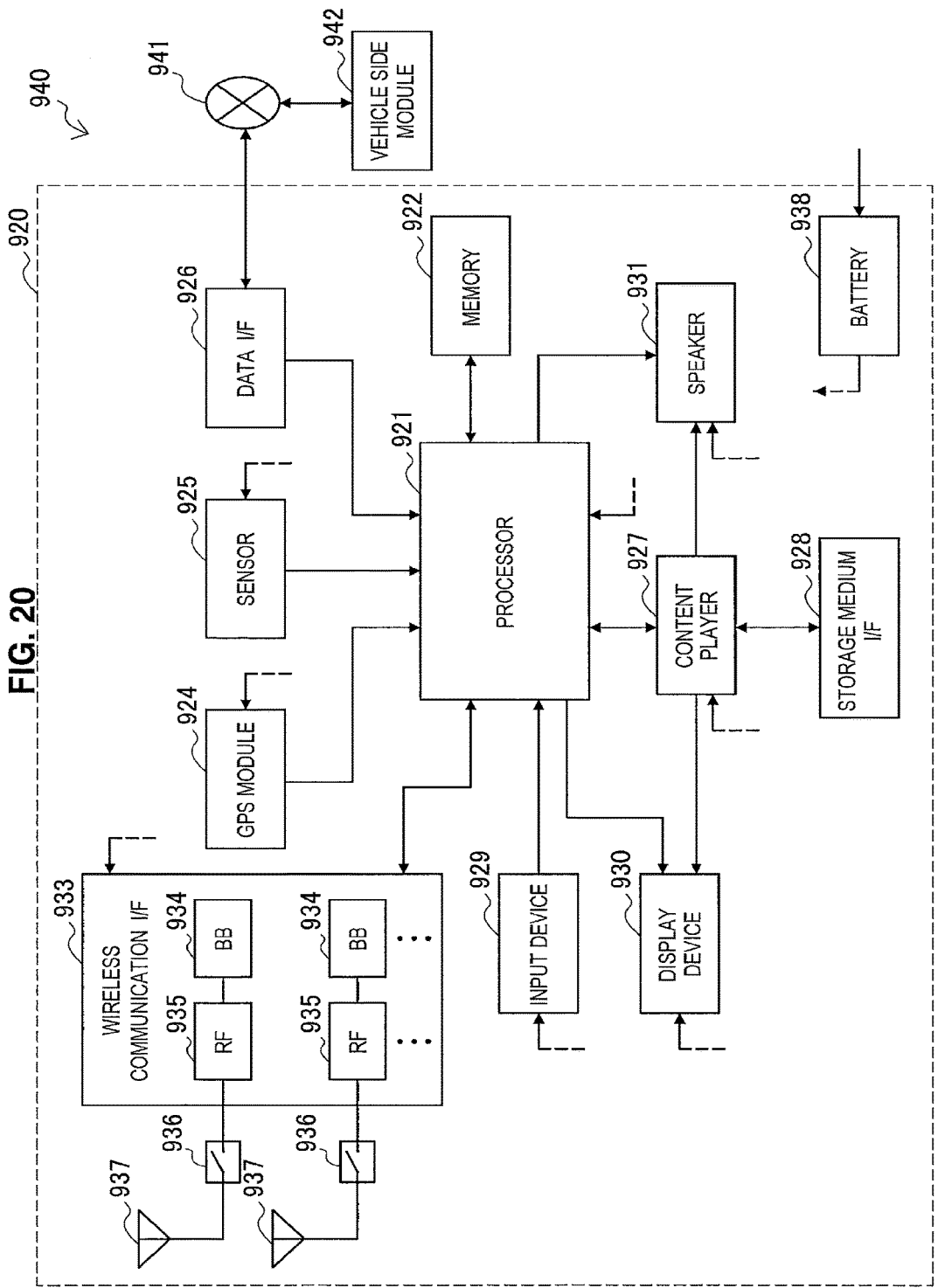
FIG. 20 is a block diagram illustrating an example of a schematic configuration of a car navigation apparatus.

FIG. 20 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g. latitude, longitude, and altitude) of the car navigation apparatus 920. The sensor 925 may include a sensor group including, for example, a gyro sensor, a geomagnetic sensor, and a barometric sensor. The data interface 926 is, for example, connected to an in-vehicle network 941 via a terminal that is not illustrated, and acquires data such as vehicle speed data generated on the vehicle side.

The content player 927 reproduces content stored in a storage medium (e.g. CD or DVD) inserted into the storage medium interface 928. The input device 929 includes, for example, a touch sensor which detects that a screen of the display device 930 is touched, a button, or a switch, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 20. FIG. 20 illustrates an example in which the wireless communication interface 933 includes a plurality of BB processors 934 and a plurality of RF circuits 935, but the wireless communication interface 933 may be a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 includes a plurality of antennas 937 as illustrated in FIG. 20. FIG. 20 illustrates an example in which the car navigation apparatus 920 includes a plurality of antennas 937, but the car navigation apparatus 920 may include a single antenna 937.

Further, the smartphone 920 may include the antenna 937 for each wireless communication system. In this case, the antenna switch 936 may be omitted from a configuration of the car navigation apparatus 920.

The battery 950 supplies electric power to each block of the car navigation apparatus 930 illustrated in FIG. 20 via a feeder line that is partially illustrated in the figure as a dashed line. The battery 950 accumulates the electric power supplied from the vehicle.

In the car navigation apparatus 920 illustrated in FIG. 20, the information acquisition unit 241 and the control unit 243 described above with reference to FIG. 9 may be mounted in the wireless communication interface 933. Alternatively, at least some of the components may be mounted in the processor 921. As an example, the car navigation apparatus 920 may be equipped with a module including some or all components of the wireless communication interface 933 (for example, the BB processor 934), and the information acquisition unit 241 and the control unit 243 may be mounted in the module. In this case, the module may store a program causing the processor to function as the information acquisition unit 241 and the control unit 243 (that is, a program causing the processor to perform the operation of the information acquisition unit 241 and the control unit 243) and execute the program. As another example, the program causing the processor to function as the information acquisition unit 241 and the control unit 243 may be installed in the car navigation apparatus 920, and the wireless communication interface 933 (for example, the BB processor 934) and/or the processor 921 may execute the program. As described above, the car navigation apparatus 920 or the module may be provided as an apparatus including the information acquisition unit 241 and the control unit 243, and the program causing the processor to function as the information acquisition unit 241 and the control unit 243 may be provided. A readable recording medium in which the program is recorded may be provided.

In addition, in the car navigation apparatus 920 shown in FIG. 20, the wireless communication unit 220 described with reference to FIG. 9 may be implemented by the wireless communication interface 933 (for example, the RF circuit 935). Moreover, the antenna unit 210 may be implemented by the antenna 937.

The technology of the present disclosure may also be realized as an in-vehicle system (or a vehicle) 940 including one or more blocks of the car navigation apparatus 920, the in-vehicle network 941, and a vehicle module 942. In other words, the in-vehicle system (or a vehicle) 940 may be provided as a device which includes the information acquisition unit 241 and the control unit 243. The vehicle side module 942 generates vehicle data such as vehicle speed, engine speed, and trouble information, and outputs the generated data to the in-vehicle network 941.

<<7. Conclusion>>

So far, each of devices and processes according to embodiments of the present disclosure have been described with reference to FIGS. 5 to 20.

(1) First Embodiment

According to the first embodiment, the base station 100 includes the information acquisition unit 151 that acquires information for correcting a result of measurements of a reference signal which is used to select a cell and transmitted over a plurality of directional beams in different directions, and the control unit 153 that notifies the terminal apparatus 200 of the information.

In addition, according to the first embodiment, the terminal apparatus 200 includes the information acquisition unit 241 that acquires information for correcting a result of measurements of a reference signal which is used to select a cell and transmitted over a plurality of directional beams in different directions, and the control unit 243 that corrects a result of measurements of the reference signal on the basis of the information.

(2) Second Embodiment

In addition, according to the second embodiment, the base station 100 includes the information acquisition unit 151 that acquires information for correcting a result of measurements of a reference signal which is used to select a cell and transmitted over a plurality of directional beams in different directions, and the control unit 153 that corrects a result of measurements of the reference signal on the basis of the information.

Accordingly, it is possible to more appropriately select a cell when transmission over directional beams is performed, for example.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although an example is described in which the system is a system that is compliant with LTE, LTE-Advanced, or a communication scheme that conforms to them, the present disclosure is not limited to such an example. For example, the communication system may be a system that conforms to another communication standard.

Further, it is not always necessary to execute the processing steps in the processing in the present specification in chronological order in order described in the flowcharts or the sequence diagrams. For example, the processing steps in the above-described processing may be executed in order different from the order described in the flowcharts or the sequence diagrams or may be executed in parallel.

In addition, a computer program for causing a processor (for example, a CPU, a DSP, or the like) provided in a device of the present specification (for example, a base station, a base station apparatus or a module for a base station apparatus, or a terminal apparatus or a module for a terminal apparatus) to function as a constituent element of the device (for example, the information acquisition unit, the control unit, or the like) (in other words, a computer program for causing the processor to execute operations of the constituent element of the device) can also be created. In addition, a recording medium in which the computer program is recorded may also be provided. Further, a device that includes a memory in which the computer program is stored and one or more processors that can execute the computer program (a base station, a base station apparatus or a module for a base station apparatus, or a terminal apparatus or a module for a terminal apparatus) may also be provided. In addition, a method including an operation of the constituent element of the device (for example, the information acquisition unit, the control unit, or the like) is also included in the technology of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An apparatus including:

an acquisition unit that acquires information for correcting a result of measurements of a reference signal which is used for selecting a cell and transmitted over a plurality of directional beams in different directions; and a control unit that notifies a terminal apparatus of the information.

(2)

The apparatus according to (1), in which the plurality of directional beams are directional beams of large-scale multiple-input multiple-output (MIMO).

(3)

The apparatus according to (1), in which the plurality of directional beams are beams having directivity in one of two directions orthogonal to each other.

(4)

The apparatus according to any one of (1) to (3), in which the reference signal for selecting a cell is a cell-specific reference signal.

(5)

The apparatus according to any one of (1) to (4), in which the information is information for correcting the result of the measurements by a difference between an amount corresponding to power allocated to directional beams of the reference signal for selecting a cell and an amount corresponding to power allocated to directional beams of a reference signal for demodulating a data signal.

(6)

The apparatus according to (5), in which the information is information indicating the difference.

(7)

The apparatus according to any one of (1) to (5), in which the information includes information about power allocated to directional beams of the reference signal for selecting a cell.

(8)

The apparatus according to (7), in which the information includes information about power allocated to directional beams of the reference signal for demodulating a data signal.

(9)

The apparatus according to any one of (1) to (5), in which the information includes information indicating the number of directional beams of the reference signal for selecting a cell.

(10)
The apparatus according to (9),
in which the information includes information indicating the number of directional beams of a reference signal for demodulating a data signal.

(11)
The apparatus according to (5), (8), or (10),
in which the reference signal for demodulating a data signal is a user-specific reference signal or a demodulation reference signal.

(12)
The apparatus according to any one of (1) to (11),
in which the control unit notifies the terminal apparatus of the information in system information or through individual signaling to the terminal apparatus.

(13)
The apparatus according to any one of (1) to (12),
in which the information includes first information for correcting a result of measurements of the reference signal transmitted by one base station and second information for correcting a result of measurements of the reference signal transmitted by a neighbor base station of the one base station.

(14)
The apparatus according to (13),
in which the second information is information transmitted by the neighbor base station to the one base station.

(15)
An apparatus including:
an acquisition unit that acquires information for correcting a result of measurements of a reference signal which is used for selecting a cell and transmitted over a plurality of directional beams in different directions; and
a control unit that corrects the result of the measurements of the reference signal on the basis of the information.

(16)
The apparatus according to (15),
in which the apparatus is a terminal apparatus or a module for the terminal apparatus; and
the information is information of which the terminal apparatus is notified by a base station.

(17)
The apparatus according to (16),
in which the information includes first information for correcting a result of measurements of the reference signal transmitted by one base station and second information for correcting a result of measurements of the reference signal transmitted by a neighbor base station of the one base station; and
the control unit corrects the result of the measurements of the reference signal transmitted by the one base station on the basis of the first information and corrects the result of the measurements of the reference signal transmitted by the neighbor base station on the basis of the second information.

(18)
The apparatus according to (17),
in which the first information is information of which the terminal apparatus is notified by the one base station, and the second information is information of which the terminal apparatus is notified by the neighbor base station.

(19)
The apparatus according to (17),
in which the first information and the second information are information of which the terminal apparatus is notified by the one base station.

(20)
The apparatus according to (15),
in which the apparatus is a base station, a base station apparatus for the base station or a module for the base station apparatus.

(21)
A method including, by a processor:
acquiring information for correcting a result of measurements of a reference signal which is used for selecting a cell and transmitted over a plurality of directional beams in different directions; and
notifying a terminal apparatus of the information.

(22)
A program causing a processor to execute:
acquiring information for correcting a result of measurements of a reference signal which is used for selecting a cell and transmitted over a plurality of directional beams in different directions; and
notifying a terminal apparatus of the information.

(23)
A readable recording medium having a program recorded thereon, the program causing a processor to execute:
acquiring information for correcting a result of measurements of a reference signal which is used for selecting a cell and transmitted over a plurality of directional beams in different directions; and
notifying a terminal apparatus of the information.

(24)
A method including, by a processor:
acquiring information for correcting a result of measurements of a reference signal which is used for selecting a cell and transmitted over a plurality of directional beams in different directions; and
correcting the result of the measurements of the reference signal on the basis of the information.

(25)
A program causing a processor to execute:
acquiring information for correcting a result of measurements of a reference signal which is used for selecting a cell and transmitted over a plurality of directional beams in different directions; and
correcting the result of the measurements of the reference signal on the basis of the information.

(26)
A readable recording medium having a program recorded thereon, the program causing a processor to execute:
acquiring information for correcting a result of measurements of a reference signal which is used for selecting a cell and transmitted over a plurality of directional beams in different directions; and
correcting the result of the measurements of the reference signal on the basis of the information.

REFERENCE SIGNS LIST 1 system
100 base station
101 cell
151 information acquisition unit
153 control unit
200 terminal apparatus
241 information acquisition unit
243 control unit

The invention claimed is:
1. An apparatus comprising circuitry configured to:
acquire information for correcting a result of measurements of a first reference signal and a second reference signal which are used for selecting a cell, wherein the first reference signal and the second reference signal are transmitted over a plurality of directional beams in different directions; and notify a terminal apparatus of the information, wherein the information is used to correct the result of the measurements at least in part based on a difference between a first amount corresponding to power allocated to directional beams of the first reference signal for selecting a cell and a second amount corresponding to power allocated to directional beams of the second reference signal for demodulating a data signal.

2. The apparatus according to claim 1, wherein the plurality of directional beams are directional beams of large-scale multiple-input multiple-output (MIMO).

3. The apparatus according to claim 1, wherein the plurality of directional beams are beams having directivity in one of two directions orthogonal to each other.

4. The apparatus according to claim 1, wherein the first reference signal for selecting a cell is a cell-specific reference signal.

5. The apparatus according to claim 1, wherein the information includes information about power allocated to directional beams of the first reference signal for selecting a cell.

6. The apparatus according to claim 5, wherein the information includes information about power allocated to directional beams of the second reference signal for demodulating a data signal.

7. The apparatus according to claim 1, wherein the information includes information indicating the number of directional beams of the first reference signal for selecting a cell.

8. The apparatus according to claim 7, wherein the information includes information indicating the number of directional beams of the second reference signal for demodulating a data signal.

9. The apparatus according to claim 1, wherein the second reference signal for demodulating a data signal is a user-specific
reference signal or a demodulation reference signal.

10. The apparatus according to claim 1, wherein the circuitry notifies the terminal apparatus of the information in system information or through individual signaling to the terminal apparatus.

11. The apparatus according to claim 1, wherein the information comprises first information for correcting a result of measurements of the first reference signal transmitted by one base station and second information for correcting a result of measurements of the first reference signal transmitted by a neighbor base station of the one base station.

12. The apparatus according to claim 11, wherein the second information is information transmitted by the neighbor base station to the one base station.

13. A terminal apparatus comprising circuitry configured to:

acquire first information from a first base station and second information from a neighbor base station of the first base station for correcting a first result of measurements of a first reference signal transmitted by the first base station and a second result of measurements of a second reference signal transmitted by the neighbor base station, wherein the first reference signal and the second reference signal are used for selecting a cell and transmitted over a plurality of directional beams in different directions; and correct the first result of the measurements of the first reference signal transmitted by the first base station on the basis of the first information; and correct the second result of the measurements of the second reference signal transmitted by the neighbor base station on the basis of the second information.

14. The apparatus according to claim 1, wherein the circuitry is further configured to:

select the cell for the terminal apparatus at least in part based on the corrected result of the measurements.

15. The terminal apparatus according to claim 13, wherein the circuitry is further configured to:

select the cell for the terminal apparatus at least in part based on the corrected first result and the corrected second result.

16. A method for selecting a cell in a network comprising:

acquiring first information from a first base station;

acquiring second information from a neighbor base station of the first base station;

correcting a first result of measurements of a first reference signal transmitted by the first base station at least in part based on the first information;

correcting a second result of measurements of a second reference signal transmitted by the neighbor base station at least in part based on the second information; and selecting a cell for a terminal apparatus at least in part based on the corrected first result and the corrected second result, wherein the first reference signal and the second reference signal are transmitted over a plurality of directional beams by the first base station and the neighbor base station, respectively.

* * * * *